(12) United States Patent
Zhang

(10) Patent No.: US 11,137,100 B2
(45) Date of Patent: Oct. 5, 2021

(54) ZERO-FLOW FIRE-RESISTANT THREAD-LOCK QUICK DISCONNECT COUPLING

(71) Applicant: Parker-Hannifin Corporation, Cleveland, OH (US)

(72) Inventor: Geoffrey R. Zhang, Northridge, CA (US)

(73) Assignee: Parker-Hannifin Corporation, Cleveland, OH (US)

(*) Notice: Subject to any disclaimer, the term of this patent is extended or adjusted under 35 U.S.C. 154(b) by 0 days.

(21) Appl. No.: 16/877,776

(22) Filed: May 19, 2020

(65) Prior Publication Data

US 2021/0247011 A1 Aug. 12, 2021

Related U.S. Application Data

(60) Provisional application No. 62/970,806, filed on Feb. 6, 2020.

(51) Int. Cl.
*F16L 37/40* (2006.01)
*F16J 15/26* (2006.01)

(52) U.S. Cl.
CPC .............. *F16L 37/40* (2013.01); *F16J 15/26* (2013.01)

(58) Field of Classification Search
CPC .. F16L 37/40; F16J 15/166; F16J 15/26; F16J 15/3216
See application file for complete search history.

(56) References Cited

U.S. PATENT DOCUMENTS

| 5,027,845 | A | 7/1991 | Silagy |
| 7,111,641 | B2 | 9/2006 | Marban |
| 8,985,131 | B2 | 3/2015 | Cheon |
| 9,863,567 | B2 | 1/2018 | Lehmann |
| 10,344,865 | B2 * | 7/2019 | Henmi et al. ........ F16J 15/3224 |

FOREIGN PATENT DOCUMENTS

EP 0371063 B1 2/1992

* cited by examiner

*Primary Examiner* — Kevin L Lee
(74) *Attorney, Agent, or Firm* — Renner, Otto, Boisselle & Sklar, LLP

(57) ABSTRACT

A zero-flow thread-lock quick connect/disconnect coupling having male and female couplers that enhance the fire-resistance capability of the coupling in a zero-flow pressurized state. The couplers include a fire-resistant seal assembly including a seal ring and non-metallic backup rings disposed. A first backup ring is made with a high-temperature non-metallic material and is formed as a delta ring for enhancing sealing performance during a fire event. A second non-metallic backup ring is formed as a half-delta ring between first and third backup rings. The third backup ring is made with a non-metallic material that is softer than the first and second backup rings and which abuts the seal ring. The female coupler includes a bearing ring that operatively connects a rotatable threaded support to the coupler body, a protrusion-slot interface between an actuating sleeve and the rotatable support, and a seal in the actuating sleeve for damping and/or debris-resistance.

19 Claims, 9 Drawing Sheets

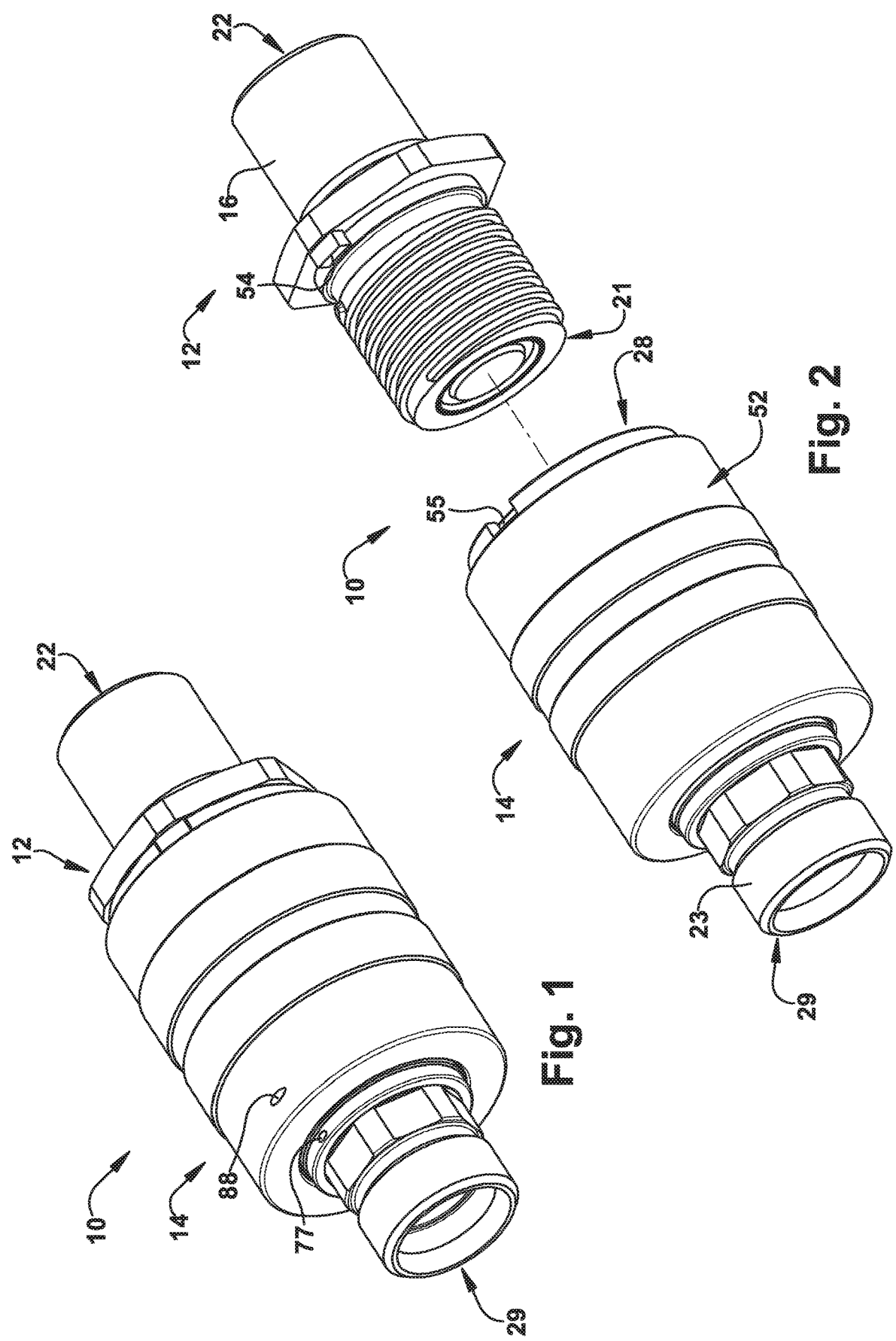

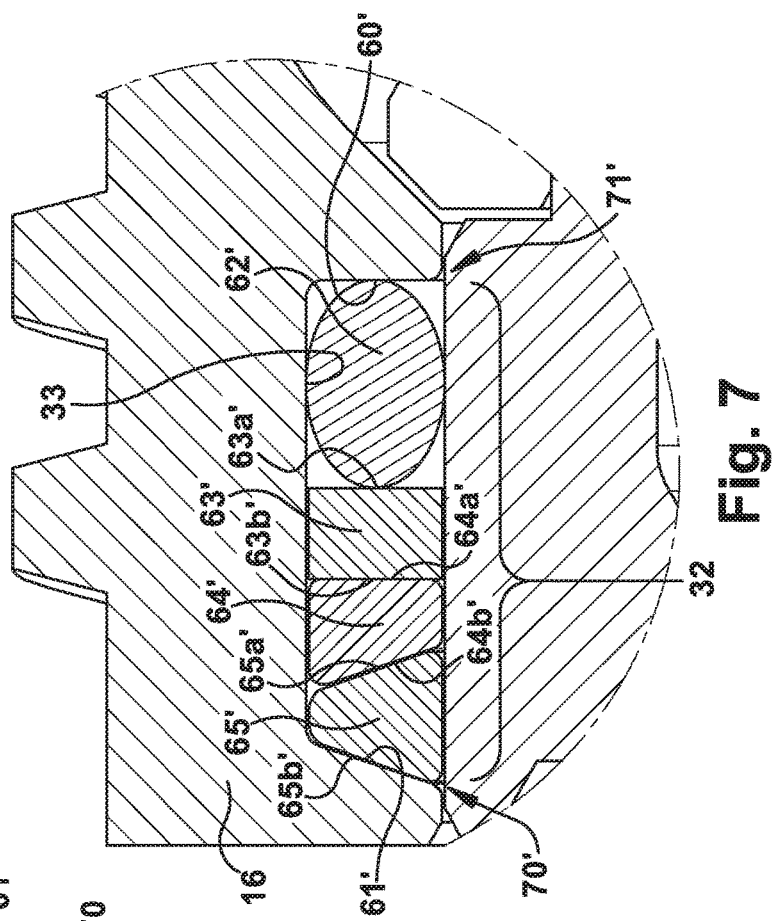
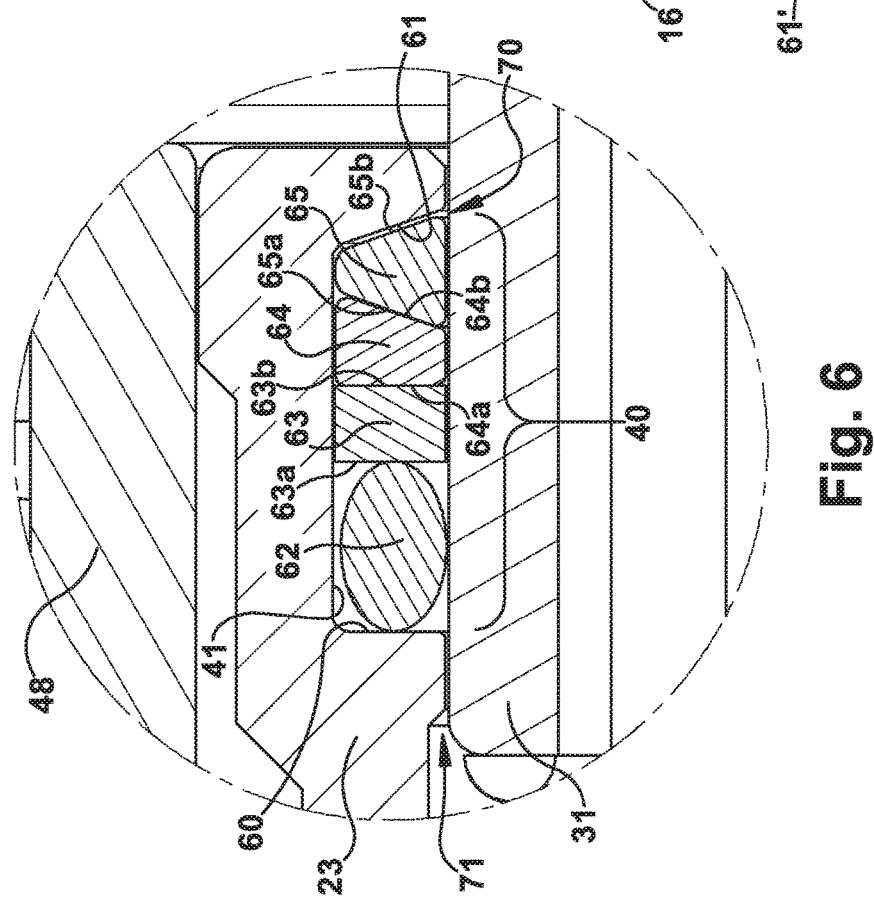

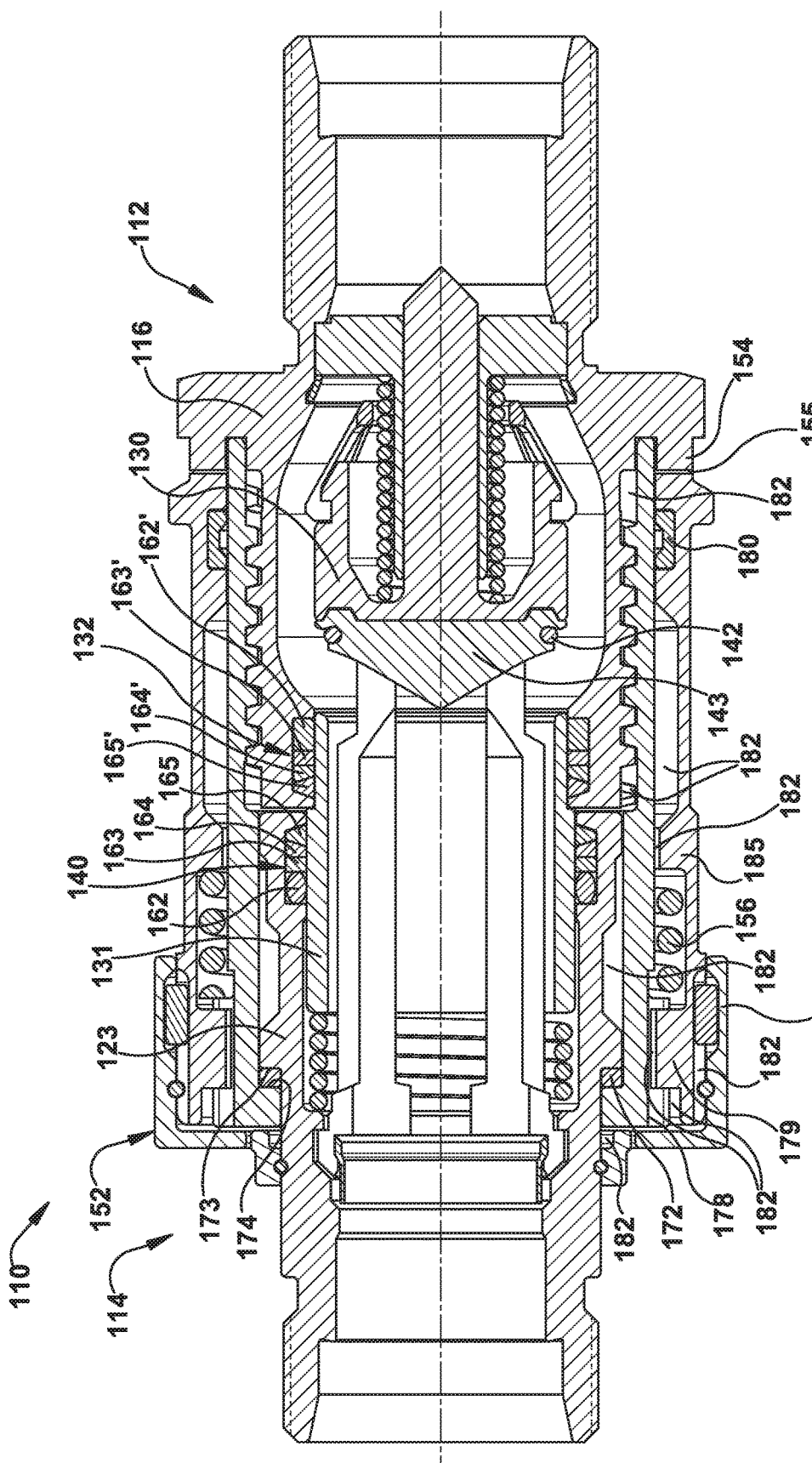

ZERO-FLOW FIRE-RESISTANT THREAD-LOCK QUICK DISCONNECT COUPLING

RELATED APPLICATIONS

This application claims the benefit of U.S. Provisional Application No. 62/970,806 filed Feb. 6, 2020, which is incorporated herein by reference in its entirety.

FIELD OF INVENTION

The present invention relates generally to quick connect/disconnect couplings, and more particularly to quick connect/disconnect couplings having a female coupler and a male nipple, such as for use in severe service applications such as aerospace and the like.

BACKGROUND

Quick connect/disconnect fluid couplings are commonly used to connect fluid lines in severe service applications, such as aerospace and the like. These quick connect/disconnect couplings generally include a male nipple and a female coupler that are mated together for fluid connection between fluid lines of a system. The male nipple generally includes a cylindrical body having a nipple portion at one end for insertion into a receiving end of the female coupler. The male nipple and female coupler each include a connection at their respective opposite ends to facilitate connection to the fluid lines of the system. When the nipple portion of the male nipple is inserted into the receiving end of the female coupler, fluid flow may be established through flow passages in each of the coupling members. Typically, one or both of the coupling members includes a valve member that is opened to permit fluid flow when the coupling members are fully-coupled together, and that is closed to terminate fluid flow when the coupling members are disconnected. For severe service applications that experience high-pressure loads, such quick connect/disconnect couplings are typically thread-together couplings that provide a mechanical advantage.

SUMMARY OF INVENTION

An aspect of the present disclosure provides a quick connect/disconnect coupling having a male nipple and female coupler, in which one or both of these coupling members provide a unique construction that enhances the performance of the quick coupling particularly for severe service applications.

For example, the exemplary quick connect/disconnect coupling may be used to quick connect and disconnect a fluid subsystem of an aircraft, such as the engine build-up unit (EBU). During an engine fire event, the engine fluid system will be shut down so that there is zero fluid flow through the system. In such a zero-flow state, there is limited cooling effect due to the lack of fluid flow through the coupling. To maintain pressure within the aircraft system during such a fire event, the quick coupling should provide sufficient sealing functionality to maintain its internal system fluid under pressure (e.g., 3,000 psig) for a period of time (e.g., at least 15 minutes) within the fire environment (e.g., 2,000° F.) at zero fluid flow through the coupling.

According to one aspect of the present disclosure, the exemplary quick coupling, including the female coupler and/or the male nipple, provides improvements in the fire resistant sealing capabilities of the coupling in a zero-flow pressurized state.

More particularly, according to one aspect, a fluid coupler for a zero-flow fire-resistant quick-disconnect fluid coupling, includes: a coupler body having an axially-extending through-passage for forming at least a portion of a fluid flow path through the coupler body; a seal groove in the coupler body, the seal groove having opposing first and second end surfaces that are spaced apart; and a seal assembly disposed in the seal groove between the opposing first and second end surfaces, the seal assembly comprising: a seal ring located in the seal groove at a first position toward the first end surface of the seal groove; a first backup ring located in the seal groove at a second position toward the second end surface of the seal groove, the first backup ring being formed as a delta ring having a wedge shape in transverse cross-section, wherein the first backup ring is made with a non-metallic material; and a second backup ring located in the seal groove interposed between the seal ring and the first backup ring, the second backup ring having an inclined surface in transverse cross-section that interfaces against a complementary inclined surface of the first backup ring, wherein the second backup ring is made with a non-metallic material, and wherein at least when pressurized and heated with zero flow through the coupler, the sealing assembly restricts leakage of fluid externally of the coupler.

In severe service applications, such as aerospace, the exemplary quick connect/disconnect coupling also should provide for ease of maintenance when servicing the aircraft or other vehicle. For example, such thread-together quick couplings should offer a simple one-hand operation for the connect/disconnect sequence, as well as provide reliable performance during the servicing of the fluid systems.

An aspect of the present disclosure provides an exemplary quick coupling, including the female coupler and/or male nipple, that improves upon the connect/disconnect sequence of the coupling and minimizes the wear on the coupling members.

More particularly, according to an aspect, a fluid coupler for a zero-flow fire-resistant quick-disconnect fluid coupling, includes: a coupler body having an axially-extending through-passage for forming at least a portion of a fluid flow path through the coupler body; a valve member axially moveable within the coupler body between a closed-position, which restricts fluid flow through the coupler body, and an open position, which permits fluid flow through the coupler body; a rotatable support radially outwardly of the coupler body, the rotatable support being supported by the coupler body and being configured to rotate about a longitudinal axis of the coupler body, the rotatable support having radially inwardly protruding threads for threadably coupling to a corresponding coupler of the fluid coupling; wherein the rotatable support is coupled to the coupler body via a bearing ring disposed in circumferential gap formed between a radially outwardly protruding shoulder of the coupler body and a radially inwardly protruding shoulder of the rotatable support that is axially spaced from and radially overlaps with the radially outwardly protruding shoulder of coupler body, thereby reducing friction and wear between the rotatable support and coupler body.

According to another aspect, a fluid coupler for a zero-flow fire-resistant quick-disconnect fluid coupling, includes: a coupler body having an axially-extending through-passage for forming at least a portion of a fluid flow path through the coupler body; a valve member axially moveable within the coupler body between a closed-position, which restricts fluid flow through the coupler body, and an open position, which permits fluid flow through the coupler body; a rotatable support radially outwardly of the coupler body, the rotatable support being supported by the coupler body and being configured to rotate about a longitudinal axis of the coupler body, the rotatable support having radially inwardly protruding threads for threadably coupling to a corresponding coupler of the fluid coupling; an actuating sleeve radially outwardly of the rotatable support, the actuating sleeve being supported by the rotatable support and being configured for locking engagement with a portion of a corresponding coupler of the fluid coupling when fully coupled together; wherein the rotatable support includes axially extending slots in a radially outer surface of the rotatable support; and wherein the actuating sleeve includes radially inwardly extending protrusions that are slidably disposed in the respective slots to thereby enable the actuating sleeve to move axially relative to the rotatable support and constraining rotational movement of the actuating sleeve relative to the rotatable support for co-rotation together, thereby enhancing sliding action of the actuating sleeve relative to the rotatable support and/or reducing wear between these components.

In severe service applications, such as aerospace, the application environment can be very harsh. For example, in an aircraft engine the vibration level typically is severe and pump impulse pressure is typically high. Thus, the exemplary quick coupling should be capable of sustaining a large amount of high-pressure impulse fatigue cycles, and also should be resistant to other environmental factors.

An aspect of the present disclosure provides an exemplary quick coupling, including the female coupler and/or male nipple, that improves upon the resistance to high-vibration, high-impulse pressure, high-impulse cycles and/or environmental conditions, such as debris or the like.

More particularly, according to an aspect, a fluid coupler for a zero-flow fire-resistant quick-disconnect fluid coupling, includes: a coupler body having an axially-extending through-passage for forming at least a portion of a fluid flow path through the coupler body; a valve member axially moveable within the coupler body between a closed-position, which restricts fluid flow through the coupler body, and an open position, which permits fluid flow through the coupler body; a rotatable support radially outwardly of the coupler body, the rotatable support being supported by the coupler body and being configured to rotate about a longitudinal axis of the coupler body, the rotatable support having radially inwardly protruding threads for threadably coupling to a corresponding coupler of the fluid coupling; an actuating sleeve radially outwardly of the rotatable support, the actuating sleeve being supported by the rotatable support and being configured for locking engagement with a portion of a corresponding coupler of the fluid coupling when fully coupled together; wherein the actuating sleeve includes a seal disposed in a seal groove in a radially inward surface of the actuating sleeve at a forward end portion thereof; and wherein the seal engages a radially outer surface of the rotatable support at a forward end portion thereof. The seal may provide a damping effect and/or may prevent debris from entering internal portions of the coupling. The seal also may further enhance the fire-resistant and vibration-resistant capabilities of the coupling in a zero-flow pressurized state during a fire event.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

FIG. 1 is a perspective view of an exemplary quick connect/disconnect fluid coupling according to an embodiment of the present disclosure, including an exemplary female coupler and an exemplary male nipple, which are shown in a fully-coupled state.

FIG. 2 is a perspective view of the quick connect/disconnect fluid coupling in FIG. 1 with the female coupler and male nipple shown in a decoupled state.

FIG. 6 is an enlarged cross-sectional side view taken from the region 6-6 in FIG. 4, showing an exemplary seal assembly of the female coupler according to an embodiment of the present disclosure.

FIG. 7 is an enlarged cross-sectional side view taken from the region 7-7 in FIG. 5, showing an exemplary seal assembly of the male nipple according to an embodiment of the present disclosure.

FIG. 11 is a cross-sectional side view of another exemplary quick connect/disconnect fluid coupling according to an embodiment of the present disclosure, including an exemplary female coupler and an exemplary male nipple, which shown in a fully-coupled state.

DETAILED DESCRIPTION

The principles and aspects of the present invention have particular application to quick connect/disconnect fluid couplings for severe service applications, such as aerospace or the like, and thus will be described below chiefly in this context. For example, the exemplary quick coupling may be suitable for use in an aircraft engine build-up unit (EBU) hydraulic system, or other fluid subsystems, such as the fuel and landing gear systems. It is also understood, however, that the principles and aspects of this invention may be applicable to other fluid couplings for other applications where desirable.

Figure 3:
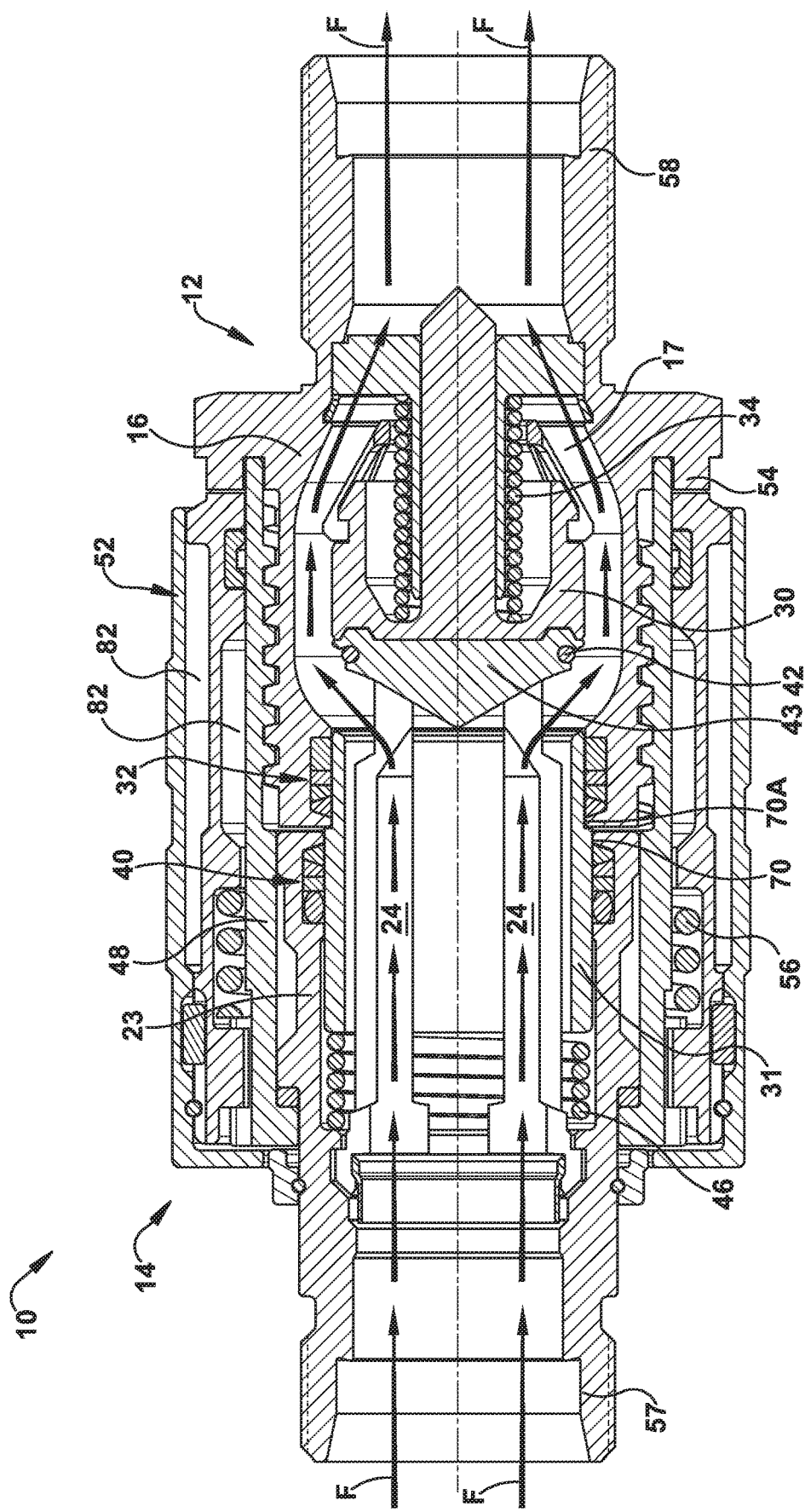
FIG. 3 is a cross-sectional side view of the quick connect/disconnect fluid coupling in FIG. 1, including the exemplary female coupler and exemplary male nipple, shown in the fully-coupled state.
Figure 4:
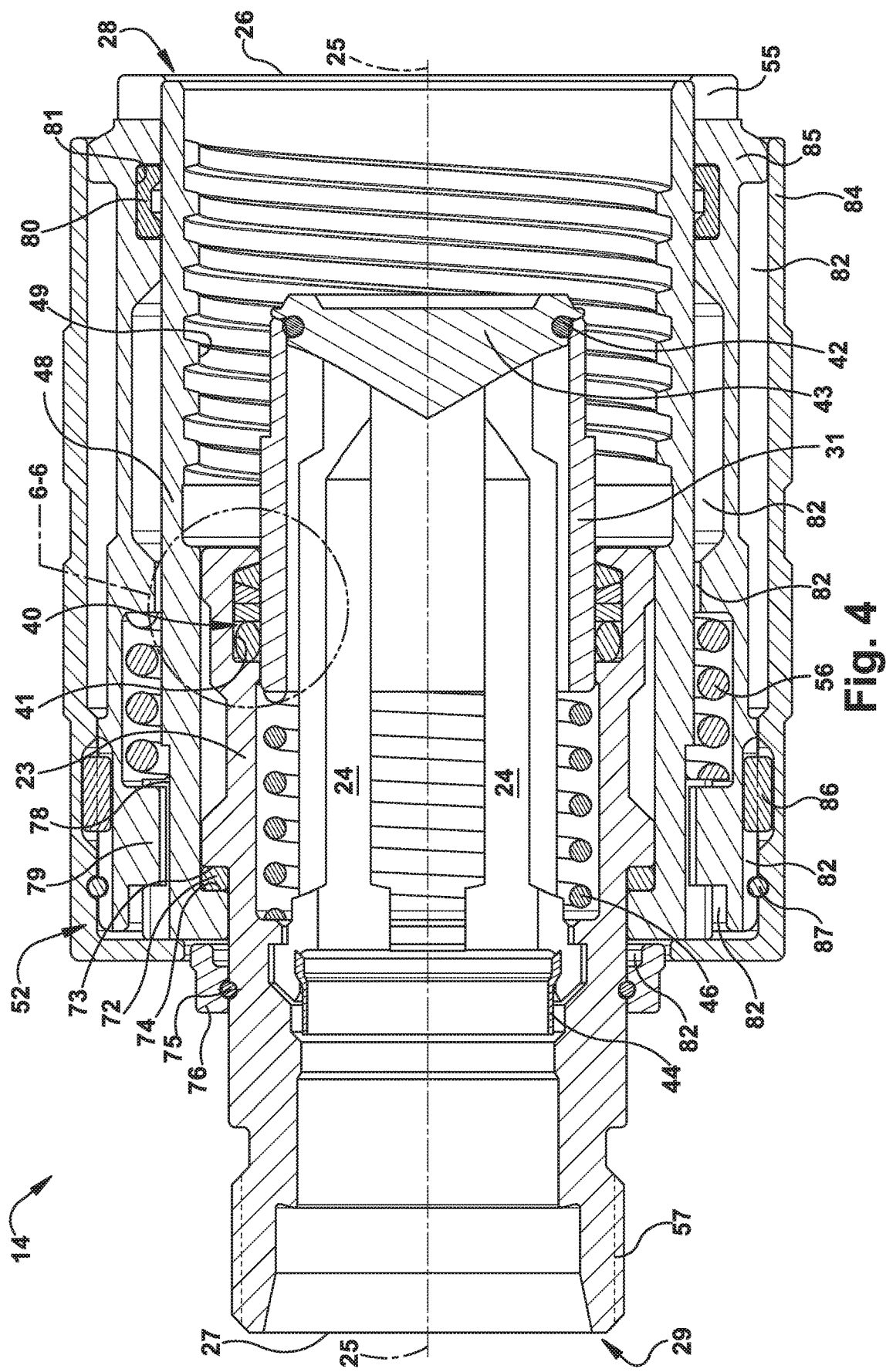
FIG. 4 is a cross-sectional side view of the exemplary female coupler in FIG. 3 shown in a decoupled state.
Figure 5:
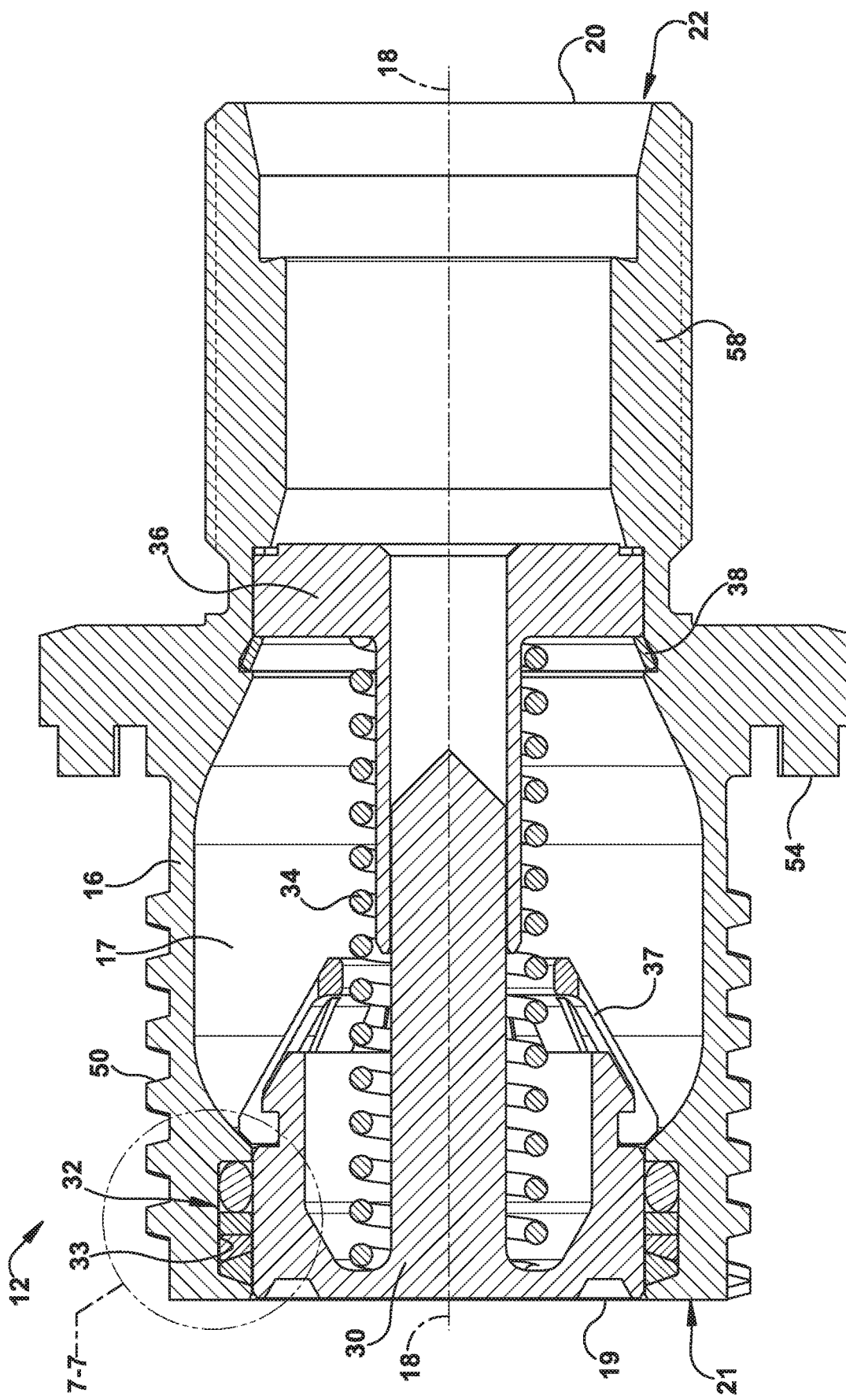
FIG. 5 is a cross-section side view of the exemplary male nipple in FIG. 3 shown in a decoupled state.

Referring to FIGS. 1-5, an exemplary quick connect/disconnect fluid coupling 10 is shown, including a male coupler 12 and a female coupler 14 (also referred to as "couplers" or "coupling members"), which are shown in a coupled together state in FIGS. 1 and 3, and in a de-mated or de-coupled state in FIGS. 2, 4 and 5.

The male coupler 12 (also referred to as a nipple) generally includes a male coupler body 16 having a through-passage 17 extending along its longitudinal axis 18 for enabling fluid flow from a forward opening 19 to a rearward opening 20 of the coupler body 16. The male nipple 12 has a forward end portion 21 configured for insertion into and engagement with the female coupler 14, and a rearward end portion 22 configured to connect with a fluid conduit or suitable housing of a hydraulic or other fluid system (not shown).

The female coupler 14 generally includes a female coupler body 23 having a through-passage 24 extending along its longitudinal axis 25 for enabling fluid flow from a forward opening 26 to a rearward opening 27 of the coupler body 23. The female coupler 14 has a forward end portion 28 configured for receiving the forward end portion 21 of the male nipple 12, and a rearward end portion 29 configured to connect with a fluid conduit or suitable housing of the hydraulic or other fluid system (not shown).

The male nipple 12 generally includes an axially moveable poppet 30, and the female coupler 14 includes an axially moveable sealing sleeve 31. Generally, the poppet 30 and sealing sleeve 31 each serve as valve members in the respective coupling members 12, 14, and each is configured to move between a closed-position, which restricts fluid flow through the corresponding coupler body, and an open position, which permits fluid flow through the corresponding coupler body.

Referring particularly to FIG. 5, the male nipple 12 is shown and described in further detail. In the illustrated state, the male nipple 12 is decoupled from the female coupler 14, and the poppet 30 of the male nipple is in a closed position. To provide sealing functionality in the closed state, the male nipple 12 includes a seal assembly 32 (described in further detail below below) which is disposed in a circumferential seal groove 33 in a radially inward surface of the male coupler body 16. The male nipple 12 also includes a biasing member 34, such as a spring, which is configured to bias the poppet 30 forwardly toward the closed position, such that a radially outward portion of the poppet 30 sealingly engages the seal assembly 32 to restrict flow through the coupler body 16. In the illustrated embodiment, the biasing member 34 is a coil spring, a rearward portion of which engages a spider portion 36 having flow passages for enabling flow across the spider portion 36 when the nipple 12 is in an open state (as shown in FIG. 3, for example). As shown, the poppet 30 may be held by retainer fingers 37 that are springily snapped into a groove of the poppet 30. The spider portion 36 is held in place by a swaged retainer 38 in the illustrated embodiment.

Referring particularly to FIG. 4, the female coupler 14 is shown and described in further detail. In the illustrated state, the female coupler 14 is decoupled from the male nipple 12, and the sealing sleeve 31 of the female coupler is in a closed position. To provide sealing functionality, the female coupler 14 includes a seal assembly 40 (describe in further detail below) which is disposed in a circumferential groove 41 in a radially inward surface of the coupler body 23. As shown, the seal assembly 40 sealingly engages against a radially outward sealing surface of the sealing sleeve 31. To also provide sealing functionality in the closed state, the female coupler includes another seal ring 42 on a stop 43 that is radially inward of the sealing sleeve 31. In exemplary embodiments, the seal 42 on the stop 43 is a PTFE O-ring. The stop 43 may include legs that are locked in inside the coupler body 23 via a swaged retainer 44. The female coupler 14 includes a biasing member 46, such as a spring, which is configured to bias the sealing sleeve 31 forwardly toward its closed position, such that a radially inward sealing portion of the sealing sleeve 31 sealingly engages the seal 42 to restrict flow through the stop 43.

As shown in the illustrated embodiment, the female coupler 14 also includes a rotatable support 48 that includes radially inwardly protruding threads 49 that are configured to threadably engage corresponding radially outwardly protruding threads 50 on the radially outward portion of the male coupler body 16 to couple the female coupler 14 to the male nipple 12 (as shown in FIG. 3, for example). The rotatable support 48 is supported by the female coupler body 23 and is configured to rotate about the longitudinal axis 25 of the coupler body. As described in further detail below, the rotatable support 48 is coupled to the female coupler body 23 to permit the support 48 to freely rotate about the longitudinal axis 25 while axially constraining movement of the support 48 relative to the coupler body 23.

In exemplary embodiments, the female coupler 14 further includes an actuating sleeve 52 that is co-rotatable, i.e. rotates together, with the rotatable support 48. As shown, the actuating sleeve 52 is disposed radially outwardly of the rotatable support 48, and is configured to move between a forward position and rearward position relative to the rotatable support 48 for engaging or disengaging from a portion of the male nipple 12 to provide a locking feature for the coupling 10. For example, as shown in FIGS. 2 and 5, the male coupler body 16 may include one or more protrusions, or tangs 54, that are configured to fit within corresponding slots 55 of the actuating sleeve 52 when the actuating sleeve is in a forward position and the coupling members 12, 14 are in a fully-coupled position. The engagement of the locking tang 54 with the locking slot 55 restricts rotational movement of the rotatable support 48, thereby restricting decoupling of the coupling members 12, 14. Such engagement also serves as a visual indication that the coupling members 12, 14 are fully-coupled together. When decoupling the coupling members 12, 14, the actuating sleeve 52 is moved to a rearward position, in which the tangs 54 of the male nipple 12 disengage from the slots 55 of the actuating sleeve 52, to permit rotational movement of the rotatable support 48, thereby permitting the female coupler 14 to be threadably decoupled from the male nipple 12. As shown, the female coupler 14 includes a biasing member 56, such as a spring, that biases the actuating sleeve 52 toward the forward (e.g., locked) position. The forward bias allows the tangs 54 of the male nipple 12 to snap into the slots 55 to provide an audible and/or visual indication that the coupling halves are fully mated and locked.

Referring again to FIG. 3, the female coupler 14 and the male nipple 12 are shown in a fully-coupled state. As shown, when threadably advanced relative to each other, the forward end of the nipple body 16 engages a shoulder of the sealing sleeve 31, thereby moving the sealing sleeve 31 rearward to unseat from the seal 42 on the stop 43 to open the flow path through the female coupler body 23. Also during such threaded coupling, the forward end of the stop 43 engages the forward end of the nipple poppet 30, thereby moving the poppet 30 rearward to unseat from the sealing assembly 32 to open the flow path through the nipple body 16. The valve members 30, 31 of the coupler and nipple are fully opened when the coupling members are fully mated and their thread locking slots 55 and tangs 54 are engaged. As shown, the seal assembly 40 of the female coupler 14 slides over the sealing sleeve 31 at all times (i.e., in both the open and closed states of the coupler 14) to seal the potential leak path between the sealing sleeve 31 and coupler body 23. In the coupled state, the sealing assembly 32 of the nipple 12 also engages the sealing sleeve 31 to seal a leak path from the opposite side. An exemplary flow path of fluid through the quick coupling 10 is shown in the illustrated embodiment via flow lines F. As shown, fluid flows through rearward end fitting portion 57, through coupler retainer 44, through coupler sealing sleeve 31 and across coupler stop 43 to the nipple half. In the nipple half, fluid flows through nipple body 16 across nipple poppet 30, across nipple poppet retainer 37, through swaged retainer 38 and across nipple spring 34, through nipple spider portion 36 to exit the nipple side via rearward fitting portion 58. Reverse fluid flow is also possible through the coupling 10.

To disconnect the female coupler 14 and male nipple 12, the actuating sleeve 52 is pulled back to disengage the tangs 54 from the slots 55. The actuating sleeve 52 is then rotated with the coupler support 48 to threadably retract the coupling members 12, 14 from each other. When the male nipple 12 and the female coupler 14 are decoupled from each other, the respective valve members 30, 31 are moved to their closed positions to terminate fluid flow through the respective passages 17, 24, as discussed above with respect to the decoupled states shown with exemplary reference to FIGS. 4 and 5.

Referring to FIG. 6, the exemplary seal assembly 40 of the female coupler 14 is shown and described in further detail. As discussed above, the seal assembly 40 is disposed in the circumferential seal groove 41 in the coupler body 23, which in the illustrated embodiment opens radially inwardly toward the sealing sleeve 31 such that the sealing assembly 40 seals against a sealing diameter formed by the sealing sleeve 31. As shown, the seal groove 41 has opposing first and second end surfaces 60, 61 that are axially spaced apart for containing the components of the seal assembly 40. In the illustrated embodiment, the forward end surface 61 of the seal groove is an inclined surface that promotes energizing the sealing assembly when the fluid coupling is under pressure. For example, the forward end surface 61 may be inclined at an angle from about 10-degrees to about 30-degrees, more particularly from about 15-degrees to about 25-degrees, and more particularly from about 18-degrees to about 19-degrees. The inclined forward end surface 61 of the seal groove 41 also promotes sealing functionality when the sealing assembly 40 is pressurized and heated during a fire event by pressing one or more components of the seal assembly 40 inwardly toward the sealing surface of the sealing sleeve 31, as described in further detail below.

In exemplary embodiments, each component of the seal assembly 40 is made with a non-metallic material, such as a suitable polymeric material. One advantage of such a non-metallic seal assembly 40 is a reduction in the scratching and wear against the sealing sleeve 31 during normal repetitive operation. For example, by reducing scratching and wear, the non-metallic seal assembly 40 enhances the endurance cycle capability of the quick coupling 10 to provide more resilience to higher levels of vibration and high pressure impulses. Reducing scratching and wear also improves sealing performance by minimizing unevenness in the sealing surfaces. Another advantage of such a non-metallic seal assembly 40 is improved sealing performance, particularly when heated during a zero-flow fire event. For example, some non-metallic materials chosen for the sealing assembly 40 can soften when heated during the zero-flow fire event to fill the extrusion gap 70 and prevent leakage of fluid. In exemplary embodiments, at least one of the non-metallic materials chosen for the sealing assembly 40 is capable of withstanding heating to high temperatures (e.g., about 2,000° F. external exposure temperature and greater than 790° F. localized internal fluid temperature) during a fire event without melting to thereby block the extrusion gap 70 and maintain sealing performance. Because of the effective filling of the extrusion gap 70 with such non-metallic material(s) during a fire event, a larger extrusion gap 70 may be utilized between the coupler body 23 and sealing sleeve 31. The larger extrusion gap 70, in turn, reduces scratching and wear caused by contact between the coupler body 23 and sealing sleeve 31.

In the illustrated embodiment, the seal assembly 40 includes a non-metallic seal ring 62 and three non-metallic backup rings 63, 64, 65. The seal ring 62 generally provides the primary sealing functionality of the seal assembly 40 under normal operating conditions. In normal operation, the non-metallic backup rings 63, 64 and 65 generally provide mechanical integrity under pressure to close the extrusion gap 70 between the metal surfaces of the coupler body 23 and sealing sleeve 31 to enable the seal ring 62 to operate at higher pressures without extruding into the gap 70 and being damaged. As discussed in further detail below, at least one of the non-metallic backup rings 63, 64, 65 is made with a high-temperature non-metallic material that maintains sealing performance during a zero-flow fire event, thereby restricting leakage externally of the coupler 14.

Each component 62, 63, 64, 65 of the seal assembly 40 is specifically configured to provide different functionality for sealing performance in normal operation or during a zero-flow fire event. Several factors influencing the configuration of each component of the seal assembly 40 include the component's location in the seal groove 41, the shape of the component, the compatibility of the component material to the fluid environment, the hardness and/or Young's modulus of the component material, the temperature-resistance of the component material, and the surface (e.g., surface finish) that the component engages. As used herein, a non-metallic component of the seal assembly 40 or a component made with a non-metallic material means that the component is predominantly made with the stated material (e.g., 50% to 100% of the base material); however, other constituent filler materials—including glasses, metals, ceramics, minerals, inorganics, organics, or other suitable fillers, or combinations thereof—may be mixed with the base material to provide the desired performance.

In exemplary embodiments, each of the components 62, 63, 64, 65 of the seal assembly 40 may be made with a different non-metallic material and/or with a different shape to provide different functionality during normal service and/or during a zero-flow fire event. For example, in exemplary embodiments the components 62, 63, 64, 65 of the seal assembly 40 are each made with a different non-metallic material having a different hardness and/or Young's modulus from each other to provide the desired sealing performance. As used herein, hardness refers to resistance to indentation, which may be measured by any suitable device on any suitable hardness scale, such as via a Durometer on the Shore scale, or the like. Alternatively or additionally, the components 62, 63, 64, 65 of the seal assembly 40 may each be made with a different non-metallic material having different thermal degradation temperatures from each other to provide desired sealing performance of the sealing assembly in a zero-flow fire event. As used herein, thermal degradation temperature refers to the temperature at which the material loses its desired mechanical properties. The thermal degradation temperature of the non-metallic materials may include the glass transition temperature, melting point, or boiling point of the material, for example. For some non-metallic polymeric materials without a melting point, the thermal degradation temperature includes the temperature at which polymeric backbone scission occurs to such degree that the material loses its mechanical performance. Alternatively or additionally, the components 62, 63, 64, 65 of the seal assembly 40 may each be made with a different shape from each other to provide desired sealing performance during normal operation and/or during a zero-flow fire event. The different shapes may be dependent on the type of material (e.g., hardness) of the component, the location of the component in the seal groove relative to fluid pressure or other forces exerted on the component, and the location of the component relative to other components for interfacing with each other in the seal groove 41.

In the illustrated embodiment, the leak path for fluid is via the gap 70 between the coupler body 23 and the sealing sleeve 31. Because the seal ring 62 provides primary sealing functionality during normal use, the seal ring 62 is disposed at an upstream portion of the leak path toward the source of fluid pressure at an axially rearward end of the seal groove 41. In the illustrated embodiment, the seal ring 62 is provided as the rearward most component and abuts the rearward end surface 60 of the groove 41. In exemplary embodiments, the seal ring 62 is formed as an O-ring seal having a circular shape in transverse cross-section and generally is in the shape of a toroid. In exemplary embodiments, the seal ring 62 is made with a resilient and relatively soft material that enables deformation and sealing performance when the coupler 14 is in use. For example, the seal ring 62 may be made with a suitable rubber or other elastomeric material. Generally, the material of the seal ring 62 is selected to be compatible with the system fluid. For example, if the system fluid is a hydraulic fluid per MIL-PRF-83282, then the seal ring material is selected as nitrile per AMS-P-83461; if the system fluid is Skydrol per AS1241 Type IV or V, then the seal ring material is selected as ethylene propylene per NAS1613 Rev. 6; and if the system fluid is jet fuel, then the seal ring material is selected as nitrile per AMS-P-5315B or fluorosilicone per AMS-R-25988, class 1, and so on.

Figure 8B:
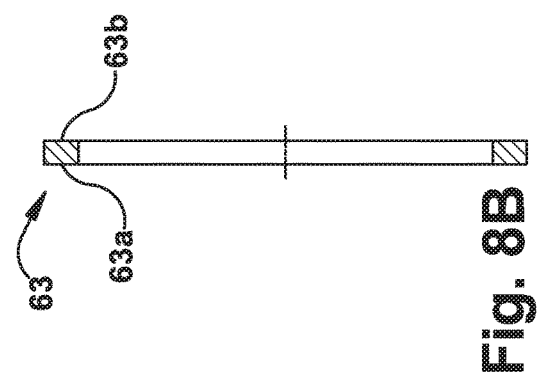
FIG. 8B is a cross-sectional view of the exemplary first backup ring taken about the line 8B-8B in FIG. 8A.
Figure 8A:
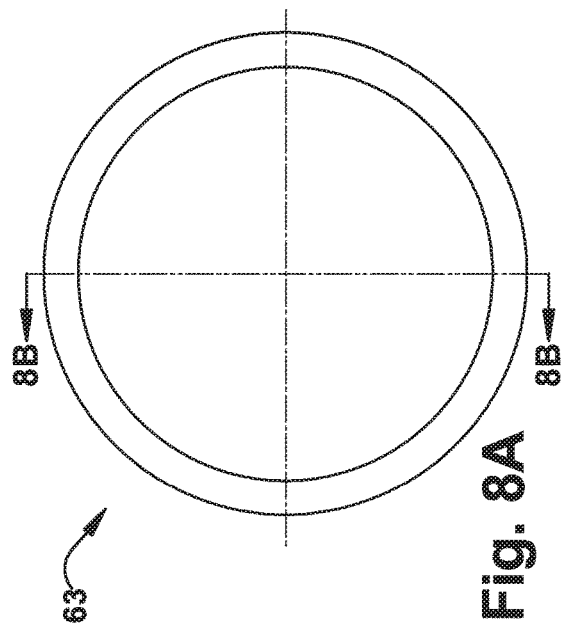
FIG. 8A is a side view of an exemplary first backup ring of the seal assembly shown in FIG. 6.

The backup rings 63, 64 and 65 are made with a harder non-metallic material than the seal ring 62 to resist deformation under load. However, because the seal ring 62 is relatively soft and prone to damage, some relatively hard non-metallic materials, such as Vespel (polyimide) or PEEK (polyetheretherketone) for example, may damage the seal ring 62. Accordingly, in exemplary embodiments, the backup ring 63 is made with a polymeric material that is softer than the backup rings 64 and 65, but which is harder than the non-metallic material of the seal ring 62. The backup ring 63 is made with a polymeric material with sufficient hardness and rigidity to provide backup ring functionality in resisting extrusion of the seal ring 62, but also is made sufficiently soft to minimize damage to the seal ring 62. In exemplary embodiments, the material of the backup ring 63 also may provide greater lubricity than the material of the backup rings 64 and 65, which minimizes friction and wear against the seal ring 62. In the illustrated embodiment, the backup ring 63 is made with a fluoropolymer material, such as polytetrafluoroethylene, or Tetralon manufactured by CoorsTek Inc. of El Segundo, Calif. For example, Tetralon 902 may be made with a base material of polytetrafluoroethylene and further includes 25% calcium metacilitate (48% calcium oxide, 49% silicon dioxide, 1% $Fe_2O_3$, 1% AlO, 0.1% $O_2$ and 0.05% MgO). As shown in the illustrated embodiment and also with reference to FIGS. 8A and 8B, the backup ring 63 has a rectangular shape in transverse cross-section, with a straight vertical rearward surface 63a that interfaces with the seal ring 62 on one side, and a straight vertical forward surface 63b that interfaces with the backup ring 64 on the other side. As shown in FIGS. 8A and 8B, the backup ring 63 may be a continuous ring without a split.

Figure 9C:
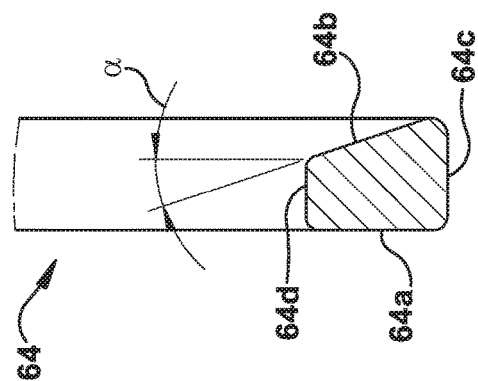
FIG. 9C is an enlarged cross-sectional view taken from region 9C in FIG. 9B.
Figure 9B:
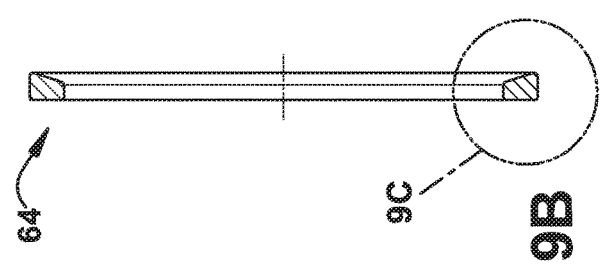
FIG. 9B is a cross-sectional view of the exemplary second backup ring taken about the line 9B-9B in FIG. 9A.
Figure 9A:
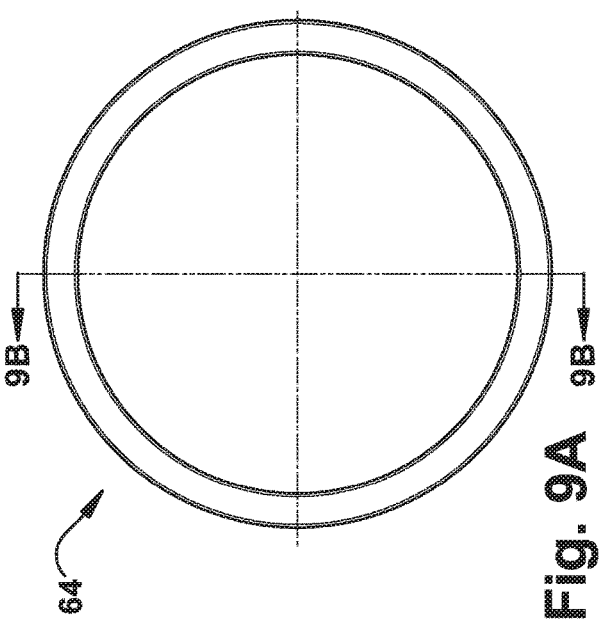
FIG. 9A is a side view of an exemplary second backup ring of the seal assembly shown in FIG. 6.

The non-metallic backup ring 64 has a greater hardness than the backup ring 63 and provides structural integrity to the seal assembly 40 under normal operating conditions. The backup ring 64 is located axially forward of the backup ring 63 to provide support to the backup ring 63 from high-pressure events exerted from the source of fluid pressure via the rearward gap 71. In the illustrated embodiment, the backup ring 64 is made with a rigid polymeric material, such as a semi-crystalline thermoplastic, for example polyetheretherketone (PEEK). As shown in FIGS. 9A-9C, the backup ring 64 is configured as a half delta ring in transverse cross-section, which may be a continuous ring without a split. As shown, the half delta ring configuration of backup ring 64 has a right trapezoid shape in transverse cross-section with an inclined surface 64b and an opposite vertical surface 64a between opposite top and bottom straight parallel surfaces 64c, 64d. The vertical surface 64a is configured to be complementary to the vertical surface 63b of the backup ring 63 for interfacing against the vertical surface 63b. The inclined surface 64b is configured to be complementary to an inclined surface 65a of the backup ring 65 (described below) for interfacing against the inclined surface 65a. In the illustrated embodiment, the angle α of the inclined surface 64b is in the range from about 10-degrees to about 30-degrees, more particularly from about 15-degrees to about 25-degrees, and more particularly from about 18-degrees to about 19-degrees. The backup ring 64 is oriented to interface with the backup ring 65 with the inclined surface 64b extending radially inwardly and axially rearwardly to promote pushing of the backup ring 65 radially inwardly toward the sealing surface during pressure events.

In the illustrated embodiment, the non-metallic backup ring 65 is configured to interface with the forward end surface 61 of the seal groove 41, and the backup ring 65 forms the last component of the seal assembly 40 which is downstream in the leak path furthest away from the source of fluid pressure.

Because the backup ring 65 is the backstop to the seal assembly 40 and is energized by its inclined surfaces 65a, 65b (discussed below), the backup ring 65 is made with a non-metallic material that has sufficient hardness to maintain its overall shape when forces are exerted upon it when the fluid coupler 14 is under pressure. The backup ring 65 also is made with a high-temperature resistance material that resists melting at elevated temperatures, thereby enabling the backup ring 65 to maintain sealing performance during a zero-flow fire event. In exemplary embodiments, the backup ring 65 is made with a polymeric material having a thermal degradation temperature that is greater than the thermal degradation temperature of the backup rings 63 and 64. For example, the backup ring 65 may be made with a polymeric material that does not have a melting point, and has a thermal degradation temperature that enables a maximum localized continuous service temperature of about 500° F., but can tolerate localized temperatures of as high as 900° F. for a period of time without loss of its mechanical properties. In the illustrated embodiment, the backup ring 65 is made with a semi-crystalline polyimide material, such as VESPEL SP-1 made by DuPont.

Figure 10C:
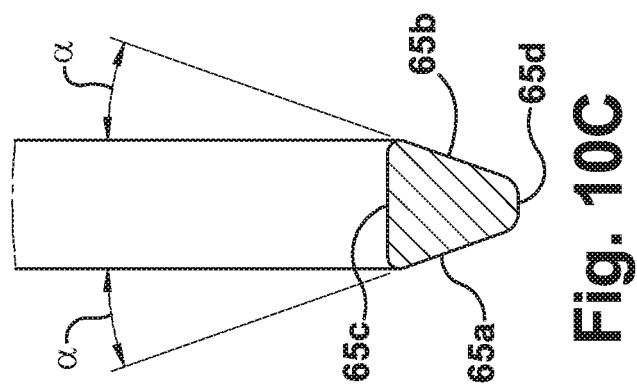
FIG. 10C is an enlarged cross-sectional view taken from region 10C in FIG. 10B.
Figure 10B:
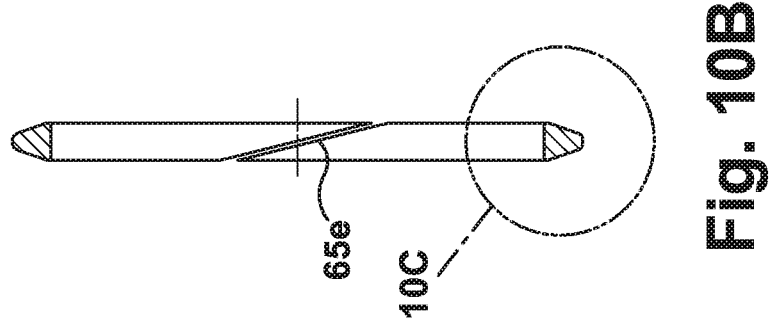
FIG. 10B is a cross-sectional view of the exemplary third backup ring taken about the line 10B-10B in FIG. 10A.
Figure 10A:
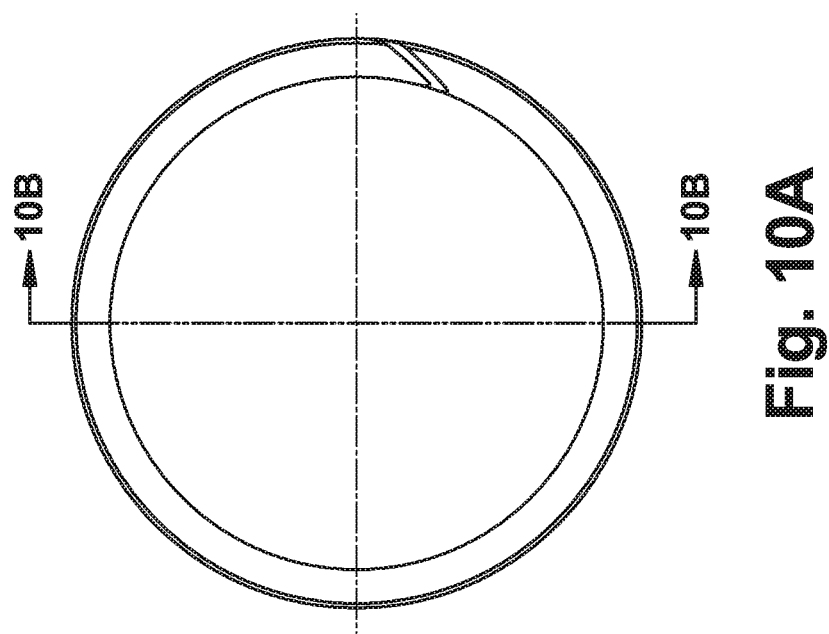
FIG. 10A is a side view of an exemplary third backup ring of the seal assembly shown in FIG. 6.

As shown in FIGS. 10A-10C, the backup ring 65 is formed as a delta ring having a wedge shape in transverse cross-section. The backup ring 65 may be a split ring with a scarf-cut 65e which may facilitate the ability of the backup ring 65 to close the extrusion gap. As shown, the wedge shape of the backup ring 65 is configured with a truncated triangular shape in transverse cross-section with opposite first and second inwardly inclined surfaces 65a, 65b that taper at an angle α from a flat base 65c at the radially inward side toward a flat apex 65d at the radially outward side. The inwardly inclined surface 65b is configured complementary to the inclined surface 61 of the seal groove 41 for interfacing against the incline surface 61, and the inwardly inclined surface 65a interfaces against the inclined surface 64b of the backup ring 64. The dual inclined surfaces 65a, 65b of the backup ring 65 provide improved energization and sealing performance by enabling pushing of the base surface 65c radially inwardly toward the sealing diameter of sealing sleeve 31 by the backup ring 64 on one side and by the inclined surface 61 of the seal groove 41 on the opposite side. In exemplary embodiments, the angle α of the inclined surfaces 65a, 65b is from about 10-degrees to about 30-degrees, more particularly from about 15-degrees to about 25-degrees, and more particularly from about 19-degrees to about 20-degrees, to match the angles of the inclined surface 64b of backup ring 64 and the inclined surface 61 of the seal groove 41.

Referring to FIG. 7, the exemplary seal assembly 32 disposed in the seal groove 33 of the male nipple 12 is shown in further detail. As shown, the configuration of the seal assembly 32 for the nipple 12 is substantially the same as the configuration of the seal assembly 40 for the female coupler 14, except a mirror image thereof and with a slightly smaller diameter. Consequently, the same reference numerals but with a prime indication are used to refer to the same structures in the seal assemblies 32, 40, and further description of the seal assembly 32 for the male nipple 12 is omitted for brevity.

An exemplary operation of the fully-assembled quick coupling 10 will now be described. When the quick coupling 10 is pressurized, the fluid pressure acts on the seal ring 62, 62' in both couplers 12, 14 which deforms under pressure to engage with the sealing surface (e.g., sealing sleeve 31 in the female coupler 14 and poppet 30 in the male nipple 12) thereby sealing the leak path on the upstream side. The axial pressure load is transferred from the seal rings 62, 62' to the backup rings 63, 63' in both couplers. The pressure loads are then transferred to the half delta backup rings 64, 64' in each coupler to push the split delta backup rings 65, 65' against the inclined surfaces 61, 61' of the seal groove in each coupler 12, 14. Under this pressure loading condition, the split delta backup rings 65, 65' are pushed radially inwardly toward the flow axis via their opposite inclined surfaces 65a, 65b and 65a', 65b' by the half delta backup ring 64, 64' on one side and the front inclined surface 61, 61' of the seal groove on the other side. The delta backup rings 65, 65' in each coupler engage with the sealing surface (e.g., sealing surfaces of sleeve 31 in the female coupler as show in FIG. 3 and poppet 30 in the male nipple in the disconnected condition as show in FIG. 5), thereby sealing the leaking path on the downstream side.

In the mated condition, during a zero-flow fire event, the exposed flame can reach a temperature of about 2000° F. Primarily, the heat from the flame during a fire vent enters the quick coupling 10 via convection, which in turn is then transmitted to the seal assemblies 32, 40 in each coupler 12, 14. When the localized internal temperature reaches a certain point, the material of the delta backup ring 65, 65' (e.g., Vespel SP-1) will soften, but will still maintain its overall shape and mechanical performance. During such heating under pressure, the delta backup ring 65, 65' is pushed inwards towards the sealing diameter via the inclined surface 64b, 64b' of the half delta backup ring 64, 64' and front inclined surface 61, 61' of the seal groove as described above, which enables the delta backup ring 65, 65' to tightly conform to the geometry contour of the sealing diameters to seal the extrusion gaps 70, 70A (as shown in FIG. 3, for example). The melting point temperatures of the seal ring 62, 62' (e.g., nitrile rubber), rectangular backup ring 63, 63' (e.g., Tetralon), and half delta backup ring 64, 64' (e.g., PEEK) are less than 650° F. When the coupling 10 reaches and exceeds the melting point temperatures of the respective non-metallic materials of the components (63, 63', 64, 64', 65, 65'), the melted polymeric materials, mixed with system fluid, will flow into the gap, and is stopped by the delta backup ring 65, 65' (e.g., Vespel SP-1) which has a thermal degradation temperature greater than that of the other materials. These melted polymers mixed with system fluid have a high viscosity and act like a patch material to fill and seal the leaking gaps. After a certain period of time of flame heating, the melted polymeric materials are solidified and harden, becoming a hard, patching filler material that permanently seals the leaking paths between the inner diametrical surfaces of delta backup ring 65, 65' and its mating metal sealing surface and extrusion gap. Also, under the flame heating during the fire event, the slit surfaces of the scarf-cuts 65e, 65e' of delta backup ring 65, 65' fuse together to close the leaking gaps between the slits.

A standardized zero-flow fire test according to SAE AS1055 is performed on the exemplary quick coupling 10 shown in FIG. 3, having fire-resistant seal assemblies 32 and 40, which include nitrile rubber O-ring seals 62, 62', Tetralon rectangular backup rings 63, 63', PEEK half delta backup rings 64, 64', and split Vespel delta backup rings 65, 65'. The quick coupling 10 also includes female coupler 14 with a double-layer actuating sleeve 52 with sliding tab-and-slot anti-rotation mechanism, straight tang-and-slot locking mechanism, and forward seal ring 80, as described in further detail below. The fire resistant seal assemblies 32, 40 employed on the both the male nipple 12 and female coupler 14 assemblies seal the leaking paths of the mated quick disconnect coupling 10. The test is conducted according to AS1055 at 3,000 psig fluid pressure in the coupling 10 with zero flow, and the coupling 10 is exposed to a 2,000° F. flame. The result of the zero-flow fire test is that the exemplary quick coupling 10 survives for 45 minutes under pressure and without leakage failure during the test, which is more than 10 times longer than a corresponding conventional thread-lock quick disconnect coupling used for the same application during the same conditions of a fire test. The internal temperature of the coupling 10 reached 792° F., in which the O-ring seals 62, 62', Tetralon rectangular backup rings 63, 63', and PEEK half delta backup rings 64, 64' melted; and in which the Vespel delta backup rings 65, 65' softened but maintained mechanical sealing performance in the manner described above.

Referring back to FIG. 4, another aspect of the present disclosure relating to reducing the friction between the connection of the rotatable support 48 to the coupler body 23 will now be described in further detail. As shown in the illustrated embodiment, the rotatable support 48 is coupled to the coupler body 23 via a bearing ring 72 disposed in circumferential gap formed between the rotatable support 48 and the coupler body 23. As shown, the circumferential gap is formed between a radially outwardly protruding shoulder 73 of the coupler body 23 and a radially inwardly protruding shoulder 74 of the rotatable support 48 that is axially spaced from and radially overlaps with the radially outwardly protruding shoulder 73. The bearing ring 72 provides an interface between the support 48 and body 23 that provides an appreciably large bearing surface area to reduce point contact and minimize wear. The bearing ring 72 may be made of a different material than the support 48 and body 23, and also may include a dry-lube coating to minimize friction and wear.

Also as shown in the illustrated embodiment, a retainer wire 75 joins a coupler cover 76 to the body 23 by feeding the wire 75 into a retainer wire groove in the cover 76 and body 23 through a loading hole 77 (FIG. 1) located in the cover 76. The coupler cover 76 is configured to prevent the rotatable support 48 from moving axially backwards when the female coupler 14 is in the de-mated condition.

Still referring to FIG. 4, another aspect of the present disclosure relating to enhancing the sliding action of the actuating sleeve 52 will now be described in further detail. As shown in the illustrated embodiment, the rotatable support 48 includes axially extending slots 78 in a radially outer surface of the rotatable support 48, and the actuating sleeve 52 includes radially inwardly extending protrusions 79, such as tabs 79, that are slidably disposed in the respective slots 78. This tab-slot connection enables the actuating sleeve 52 to move axially relative to the rotatable support 48 while constraining rotational movement of the actuating sleeve 52 relative to the rotatable support 48 for co-rotation together. In other words, when the actuating sleeve 52 is rotated by the user, the actuating sleeve 52 will transfer the toque through the tabs 79 and slots 78 to drive the support 48 to rotate together with the actuating sleeve 52. In the illustrated embodiment, the slots 78 and corresponding protrusions 79 (e.g., tabs) may have rectangular profiles in transverse cross-section to increase surface area and minimize point loading, thereby minimizing wear.

As discussed above, the actuating sleeve 52 is biased forwardly to lock against the male nipple 12 when in the fully-mated condition. As shown in FIGS. 1 and 3, when the coupler 14 and nipple 12 are fully connected, the slots 55 in the actuating sleeve 52 snap into the tangs 54 of nipple 12 to provide an audible and/or visual indication of the fully-mated condition. These features also provide locking functionality to prevent the actuating sleeve 52 from being rotated relative to the nipple body 16, and thereafter to prevent the connecting threads 49, 50 from disengaging. In the illustrated embodiment, the tang-slot connection is a straight connection. To disengage the tang-slot locking mechanism, the user pulls the actuating sleeve 52 back to disengage the locking slots 55 on the front end of actuating sleeve 52 from the locking tangs 54 on the body 16 of nipple 12 to allow the actuating sleeve 52 and support 48 to rotate and threadably disengage the female coupler 14 from the male nipple 12.

Still referring to FIG. 4, another aspect of the present disclosure relating to enhancing the damping effect of the coupler 14 and/or restricting debris from entering internal portions of the coupler 14 will now be described in further detail. As shown in the illustrated embodiment, the actuating sleeve 52 includes a seal ring 80 disposed in a seal groove 81 in a radially inward surface of the actuating sleeve 52 at a forward end portion thereof. As shown, the seal ring 80 engages a radially outer surface of the rotatable support 48 at a forward end portion thereof.

Such a seal ring 80 provides one or more of the following functions during normal operation: (i) to prevent sand, dust or other debris from migrating from the external environment into to a spring cavity of the actuating sleeve 52; and (ii) to generate a sliding friction force to disrupt the harmonic vibration caused by the spring 56 and/or actuating sleeve 52 to enhance the resistance of the quick coupling 10 to high vibrations (e.g., greater than 20 g).

The seal ring 80 also may provide advantages during a fire event. During a fire event, the spring 56 is heated by the flame and will lose its spring force. The seal ring 80 will melt and the melted polymeric material of the seal ring 80 will flow into and fill the sliding gap between the actuating sleeve 52 and support 48 at the forward end portion thereof. After a certain period of time of flame heating, the melted polymeric material of the seal ring 80 will solidify and harden to generate a large sticking friction force to compensate the lost spring force of spring 56 to prevent the actuating sleeve 52 from moving back to disengage the locking tang-slot connection between nipple 12 and coupler 14 and prevent the coupling members from being disconnected by vibration during the fire event. Still referring to FIG. 4, another aspect of the present disclosure relating to thermally insulating the sealing assembly or assemblies 32, 40 will now be described in further detail. As shown in the illustrated embodiment, the actuating sleeve 52 of the female coupler 14 has annular insulating air gaps 82 that surround the seal assembly or assemblies 32, 40. For example, as shown in the illustrated embodiment in FIGS. 3 and 4, there are multiple inner and outer recessed areas that are formed in the components of quick coupling, which form air gaps 82 after these components are assembled. These air gaps 82 surround the fire-resistant seal assemblies of the coupler and nipple (when mated) to isolate the heat transfer from the exposed flame (e.g., 2000° F.) during the fire event to thereby enhance the reliability of the seal assemblies 32, 40.

In exemplary embodiments, the actuating sleeve 52 includes an outer actuating sleeve portion 84 and an inner actuating sleeve portion 85 which form insulating air gaps 82 therebetween. As shown, two anti-rotation dowel pins 86 may be lodged in slots of the outer actuating sleeve portion 84 and inner actuating sleeve portion 85, and a retainer wire 87 may join the inner and outer actuating sleeves 84, 85 together by feeding the wire 87 into a retainer wire groove through a loading hole 88 (FIG. 1) located in the outer actuating sleeve portion 84. In this manner, the outer actuating sleeve portion 84 is firmly jointed to the inner actuating sleeve portion 85 to axially and rotationally constrain their movement together. As such, the rotating torsional load applied to the outer actuating sleeve portion 84 will be transferred through the inner actuating sleeve portion 85 to the support 48 by the anti-rotation dowel pins 86, and through the sliding and anti-rotation tabs 79 of the inner actuating sleeve portion 84 in the slots 78 of the rotatable support 48 during the connect and disconnect sequence. The inner actuating sleeve portion 85 is spring loaded via spring 56. The end of the outer actuating sleeve portion 84 contacts the end of the rotatable support 48 to form a stop to prevent the inner actuating sleeve portion 85 and outer actuating sleeve portion 84 from moving further forward when the coupler 14 is disconnected from the nipple 12.

Turning now to FIG. 11, another exemplary embodiment of a quick connect/disconnect coupling 110, including an exemplary female coupler 114 and exemplary male nipple 112, is shown. The quick coupling 110 is substantially similar to the above-referenced quick coupling 10, and consequently the same reference numerals but indexed by 100 are used to denote structures corresponding to similar structures in the quick couplings 10, 110. In addition, the foregoing description of the quick coupling 10 is equally applicable to the quick coupling 110 except as noted below. It is also understood that aspects of the quick couplings 10, 110 may be substituted for one another or used in conjunction with one another where applicable.

As shown in the exemplary embodiment of FIG. 11, the quick coupling 110 is essentially the same as the quick coupling 10, except that the outer actuating sleeve portion 184 of quick coupling 110 has been axially shortened and thus does not have radially outer isolation air gaps. Such a design reduces the front end outer diameter of the actuating sleeve 52 by about 66%, which reduces weight and cost of the coupler 110.

A standardized zero-flow fire test according to SAE AS1055 is performed on the exemplary quick coupling 110 shown in FIG. 11, having fire-resistant seal assemblies 132 and 140 that include nitrile rubber O-ring seals 162, 162', Tetralon rectangular backup rings 163, 163', PEEK half delta backup rings 164, 164', and split Vespel delta backup rings 165, 165'. As discussed above, the quick coupling 110 includes female coupler 114 with an axially truncated outer actuating sleeve portion 184 such that the inner actuating sleeve portion 185 forms a single-layer of outer insulation. The actuating sleeve 152 includes sliding tab 179 and slot 178 anti-rotation mechanism, straight tang 154 and slot 155 locking mechanism, and seal ring 180, as described above in connection with quick coupling 10. The fire resistant seal assemblies 132, 140 employed on both the male nipple 112 and female coupler 114 assemblies seal the leaking paths of the mated quick disconnect coupling 110. The test is conducted according to AS1055 at 3,000 psig fluid pressure in the coupling 110 with zero flow, and the coupling 110 is exposed to a 2,000° F. flame. The result of the zero-flow fire test is that the exemplary quick coupling 110 survived for 30 minutes under pressure and without leakage failure during the test. The internal temperature of the coupling 110 reached 674° F., in which the O-ring seals 162, 162', Tetralon rectangular backup ring 163, 163', and PEEK half delta backup rings 164, 164' melted; and in which the Vespel delta backup rings 165, 165' softened but maintained mechanical sealing performance in the manner described above.

Figure 12:
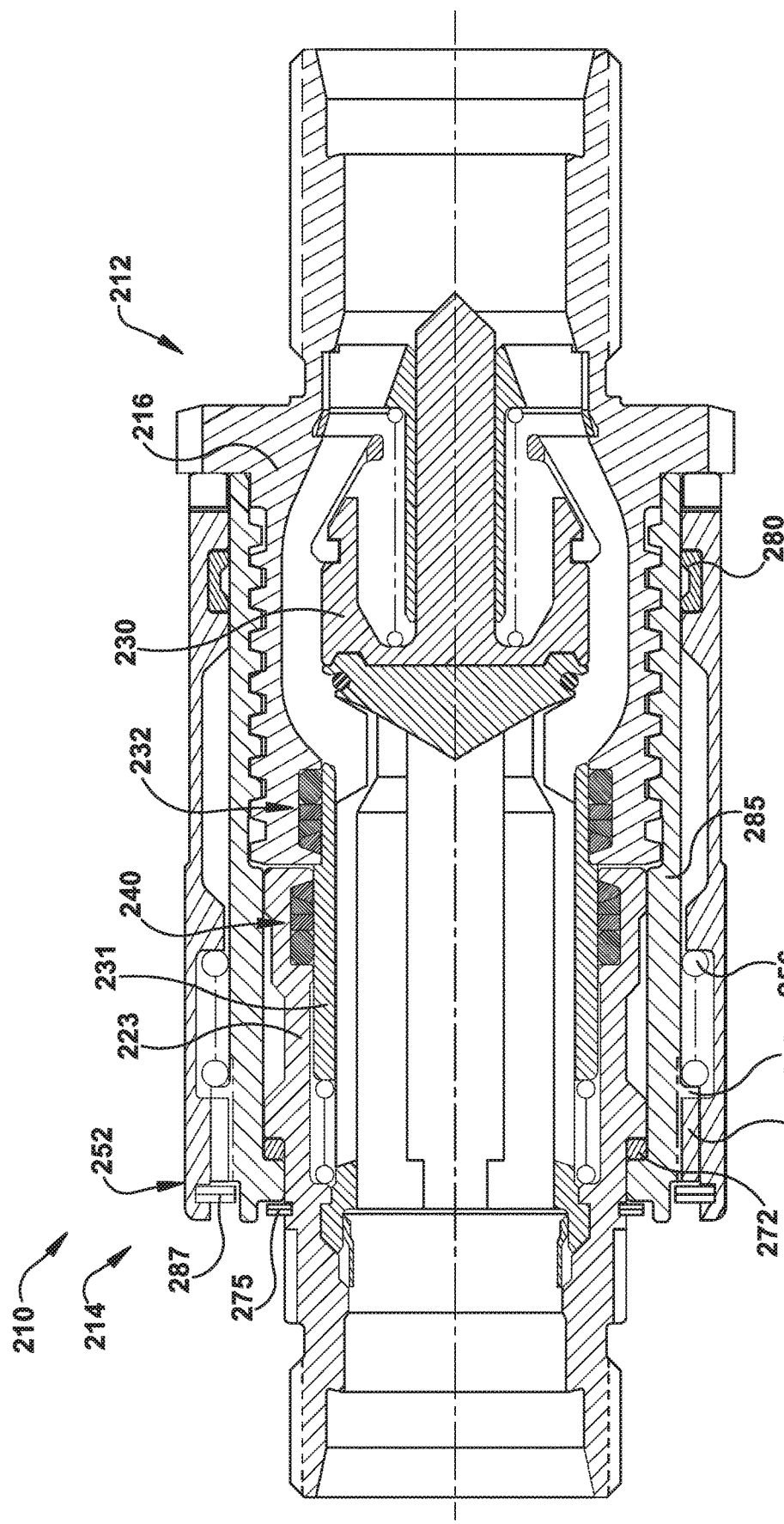
FIG. 12 is a cross-sectional side view of another exemplary quick connect/disconnect fluid coupling according to an embodiment of the present disclosure, including an exemplary female coupler and an exemplary male nipple, which shown in a fully-coupled state.

Turning now to FIG. 12, another exemplary embodiment of a quick connect/disconnect coupling 210, including an exemplary female coupler 214 and exemplary male nipple 212, is shown. The quick coupling 210 is substantially similar as the above-referenced quick coupling 10, and consequently the same reference numerals but indexed by 200 are used to denote structures corresponding to similar structures in the quick couplings 10, 210. In addition, the foregoing description of the quick couplings 10 and 110 are equally applicable to the quick coupling 210 except as noted below. It is also understood that aspects of the quick couplings 10, 110, 210 may be substituted for one another or used in conjunction with one another where applicable.

In the illustrated embodiment, the dowel pins 86 and cover 76 from the embodiment of quick coupling 10 are eliminated in the embodiment of the quick coupling 210. In addition, the retainer wires 75 and 87 of the quick coupling 10 are replaced with two retaining rings 275 and 287 in the quick coupling 210 to provide similar functionality. In exemplary embodiments, the retaining rings 275 and 287 are spiral retaining rings. Such a design reduces the weight, outside diameter, overall length, and cost of coupler 214 compared to coupler 14.

A zero-flow thread-lock quick connect/disconnect coupling having male and female couplers that enhance the fire-resistance capability of the coupling in a zero-flow pressurized state. The couplers include a fire-resistant seal assembly including a seal ring and non-metallic backup rings disposed. A first backup ring is made with a high-temperature non-metallic material and is formed as a delta ring for enhancing sealing performance during a fire event. A second non-metallic backup ring is formed as a half-delta ring between first and third backup rings. The third backup ring is formed as a rectangular shape in transverse cross-section and made with a non-metallic material that is softer than the first and second backup rings and which abuts the seal ring. The female coupler includes a bearing ring that operatively connects a rotatable threaded support to the coupler body, a protrusion-slot interface between an actuating sleeve and the rotatable support, and a seal in the actuating sleeve for damping and/or debris-resistance. Such a unique design including one or more of the foregoing features enhances the quick coupling's endurance cycle capability and/or fire sustainability, such that quick coupling has improved resilience to higher levels of vibration and high pressure impulse cycles, and can survive a fireproof test in a zero-flow pressurized state.

According to one aspect of the present disclosure, a quick disconnect coupling includes: a coupler having a spring-loaded sleeve and a coupler housing that carries a coupler fire-resistant combination seal in a coupler groove that has an angled front surface, wherein the fire-resistant combination seal is sandwiched between the sleeve and the coupler housing; a nipple having a spring-loaded poppet and a nipple housing that carries a nipple fire-resistant combination seal in a nipple groove having an angled front surface, wherein the fire-resistant combination seal is sandwiched between the poppet and the nipple housing in a decoupled state, and between the sealing sleeve and the nipple housing in a coupled state, wherein when the coupling is pressurized and heated, the coupler fire-resistant combination seal is pushed towards a sealing diameter by the front angled edge of the coupler groove and the nipple fire-resistant combination seal is pushed towards the sealing diameter by the front angled edge of the nipple groove.

Embodiments may include one or more of the following additional features, separately or in any combination.

In some embodiments, the coupler fire-resistant combination seal comprises a coupler O-ring, a coupler first backup ring, a coupler second backup ring and a coupler third backup ring, and the nipple fire-resistant combination seal comprises a nipple O-ring, a nipple first backup ring, a nipple second backup ring and a nipple third backup ring.

In some embodiments, the coupler second backup ring has an angled front surface, and the nipple second backup ring has an angled front surface.

In some embodiments, the coupler first backup ring has a wedge-shaped cross-section, and the nipple first backup ring has a wedge-shaped cross-section.

In some embodiments, the coupler second backup ring has an angled surface and the nipple second backup ring has an angled surface.

In some embodiments, under a pressure loading condition the coupler first backup ring is pushed inwards towards a flow axis by the coupler groove angled front surface and the angled surface of the coupler second backup ring, and the nipple first backup ring is pushed inwards towards a flow axis by the nipple groove angled front surface and the angled surface of the nipple second backup ring.

In some embodiments, the angled front surface of the coupler groove has an angle within the range of about 10° to about 30°, and the angled front surface of the nipple groove has an angle within a range of about 10° to about 30°.

In some embodiments, the angled front surface of the coupler groove has an angle within the range of about 15° to about 25°, and the angled front surface of the nipple groove has within the range of about 15° to about 25°.

In some embodiments, the angled front surface of the coupler groove has an angle within the range of about 18° to about 19°, and the angled front surface of the nipple groove has within the range of about 18° to about 19°.

In some embodiments, the wedge-shaped cross-section of the coupler first backup ring has a first wedge surface and a second wedge surface, and the wedge-shaped cross-section of the nipple first backup ring has a third wedge surface and a fourth wedge surface, and wherein the angle of the first wedge surface, the second wedge surface, the third wedge surface and the fourth wedge surface is between about 15° to about 30°.

In some embodiments, the wedge-shaped cross-section of the coupler first backup ring has a first wedge surface and a second wedge surface, and the wedge-shaped cross-section of the nipple first backup ring has a third wedge surface and a fourth wedge surface, and wherein the angle of the first wedge surface, the second wedge surface, the third wedge surface and the fourth wedge surface is between about 15° to about 30°.

In some embodiments, the wedge-shaped cross-section of the coupler first backup ring has a first wedge surface and a second wedge surface, and the wedge-shaped cross-section of the nipple first backup ring has a third wedge surface and a fourth wedge surface, and wherein the angle of the first wedge surface, the second wedge surface, the third wedge surface and the fourth wedge surface is between about 19° to about 20°.

According to another aspect of the present disclosure, a fluid coupler for a zero-flow fire-resistant quick-disconnect fluid coupling, includes: a coupler body having an axially-extending through-passage for forming at least a portion of a fluid flow path through the coupler body; a seal groove in the coupler body, the seal groove having opposing first and second end surfaces that are spaced apart; and a seal assembly disposed in the seal groove between the opposing first and second end surfaces, the seal assembly comprising: a seal ring located in the seal groove at a first position toward the first end surface of the seal groove; a first backup ring located in the seal groove at a second position toward the second end surface of the seal groove, the first backup ring being formed as a delta ring having a wedge shape in transverse cross-section, wherein the first backup ring is made with a non-metallic material; and a second backup ring located in the seal groove interposed between the seal ring and the first backup ring, the second backup ring having an inclined surface in transverse cross-section that interfaces against a complementary inclined surface of the first backup ring, wherein the second backup ring is made with a non-metallic material, and wherein at least when pressurized and heated with zero flow through the coupler, the sealing assembly restricts leakage of fluid externally of the coupler.

Embodiments may include one or more of the following additional features, separately or in any combination.

In some embodiments, the seal assembly further comprises a third backup ring in the seal groove interposed between the second backup ring and the seal ring, the third backup ring having a straight surface in transverse cross-section that interfaces against a complementary straight surface, in transverse cross section, of the second backup ring.

In some embodiments, the second backup ring is formed as a half delta ring having a right trapezoid shape in transverse cross-section with the straight surface being a vertical surface opposite the inclined surface that interfaces against the first backup ring.

In some embodiments, the third backup ring has a rectangular shape in transverse cross-section in which the straight surface of the third backup ring is a vertical surface that interfaces against the vertical surface of the second backup ring.

In some embodiments, the seal groove is a circumferential seal groove and the first end surface of the seal groove is located axially upstream of the second end surface in a leak path of the coupler toward a source of fluid pressure, and wherein the second end surface of the seal groove is an inclined surface in transverse cross-section.

In some embodiments, the wedge shape of the first backup ring is configured with a truncated triangular shape in transverse cross-section, the truncated triangular shape having opposite first and second inwardly inclined surfaces, the first inwardly inclined surface configured complementary to, and interfacing against, the inclined surface of the second end surface of the seal groove.

In some embodiments, the second backup ring is configured with a right trapezoid shape in transverse cross-section, the right trapezoid shape having the inclined surface and an opposite vertical surface, the inclined surface configured complementary to, and interfacing against, the second inwardly inclined surface of the first backup ring.

In some embodiments, the seal assembly further comprises a third backup ring disposed in the seal groove that is interposed between the second backup ring and the seal ring, the third backup ring being configured with a rectangular shape in transverse cross-section, the rectangular shape having opposite first and second vertical surfaces, the first vertical surface configured complementary to, and interfacing against, the vertical surface of the second backup ring.

In some embodiments, the seal ring is a toroidal O-ring seal that abuts the second vertical surface of the third backup ring, the seal ring being located adjacent to the first end surface of the seal groove.

In some embodiments, the seal ring, the first backup ring, the second backup ring, and the third backup ring are each made with a non-metallic material.

In some embodiments, the seal ring, the first backup ring, the second backup ring, and the third backup ring are made with different non-metallic materials from each other.

In some embodiments, the third backup ring is harder than the seal ring and softer than the first and second backup rings.

In some embodiments, the second backup ring is harder than the seal ring and the third backup ring.

In some embodiments, the first backup ring is harder than the seal ring and the third backup ring.

In some embodiments, the first backup ring is a polymeric material that has a thermal degradation temperature that is greater than the respective melting point temperatures of the second backup ring, the third backup ring, and the seal ring.

In some embodiments, when the coupler is heated while under fluid pressure to a temperature beyond the respective melting point temperatures of the second backup ring, the third backup ring, and the seal ring, the first backup ring is pushed towards a sealing diameter by at least the second end surface of the seal groove to thereby restrict leakage of fluid externally of the coupler.

In some embodiments, the third backup ring has greater lubricity than the first and second backup rings.

In some embodiments, the first backup ring is made with a semi-crystalline polyimide material.

In some embodiments, the second backup ring is made with a polyetheretherketone material.

In some embodiments, the third backup ring is made with a fluoropolymer material.

In some embodiments, the seal ring is made with an elastomeric material.

In some embodiments, the fluid coupler is a male nipple, and the coupler body is a nipple body.

In some embodiments, a radially outward portion of the male nipple body has radially outwardly protruding threads for threadably coupling to a corresponding female coupler.

In some embodiments, a valve member is axially moveable within the male nipple body between a closed-position, which restricts fluid flow through the male nipple body, and an open position, which permits fluid flow through the male nipple body.

In some embodiments, the seal groove opens radially inwardly such that the seal assembly engages the valve member of male nipple when in the closed position.

In some embodiments, the fluid coupler is a female coupler further comprising: a rotatable support radially outwardly of the coupler body, the rotatable support being supported by the coupler body and being configured to rotate about a longitudinal axis of the coupler body, wherein the rotatable support has radially inwardly protruding threads for threadably coupling to a corresponding male nipple; and a sealing sleeve axially moveable within the coupler body between a closed-position, which restricts fluid flow through the coupler body, and an open position, which permits fluid flow through the coupler body; wherein the seal groove opens radially inwardly such that the seal assembly engages the sealing sleeve when in the open or closed position.

In some embodiments, the female coupler further comprises an actuating sleeve radially outwardly of the rotatable support, the actuating sleeve being supported by the rotatable support for co-rotation therewith, and the actuating sleeve being axially movable relative to the rotatable support, the actuating sleeve being forwardly biased to lockingly engage with a portion of a corresponding male nipple when fully coupled together.

In some embodiments, the actuating sleeve has annular insulating air gaps that surround the seal assembly.

In some embodiments, the fluid coupler is a female coupler further comprising: a rotatable support radially outwardly of the coupler body, the rotatable support being supported by the coupler body and being configured to rotate about a longitudinal axis of the coupler body, the rotatable support having radially inwardly protruding threads for threadably coupling to a corresponding male nipple; wherein the rotatable support is coupled to the coupler body via a bearing ring disposed in circumferential gap formed between a radially outwardly protruding shoulder of the coupler body and a radially inwardly protruding shoulder of the rotatable support that is axially spaced from and radially overlaps with the radially outwardly protruding shoulder of the coupler body.

In some embodiments, the fluid coupler is a female coupler further comprising: a rotatable support radially outwardly of the coupler body, the rotatable support being supported by the coupler body and being configured to rotate about a longitudinal axis of the coupler body, wherein the rotatable support has radially inwardly protruding threads for threadably coupling to a corresponding male nipple; and an actuating sleeve radially outwardly of the rotatable support; wherein the rotatable support includes axially extending slots in a radially outer surface of the rotatable support; and wherein the actuating sleeve includes radially inwardly extending protrusions that are slidably disposed in the respective slots to thereby enable the actuating sleeve to move axially relative to the rotatable support and constraining rotational movement of the actuating sleeve relative to the rotatable support for co-rotation together.

In some embodiments, the fluid coupler is a female coupler further comprising: a rotatable support radially outwardly of the coupler body, the rotatable support being supported by the coupler body and being configured to rotate about a longitudinal axis of the coupler body, wherein the rotatable support has radially inwardly protruding threads for threadably coupling to a corresponding male nipple; and an actuating sleeve supported radially outwardly of the rotatable support, the actuating sleeve being supported by the rotatable support for co-rotation therewith, and the actuating sleeve being axially movable relative to the rotatable support; wherein the actuating sleeve includes a seal disposed in a seal groove in a radially inward surface of the actuating sleeve at a forward end portion thereof; and wherein the seal engages a radially outer surface of the rotatable support at a forward end portion thereof.

According to an aspect, a zero-flow fire-resistant quick-disconnect fluid coupling includes: the fluid coupler according to any of the foregoing or following, in which the fluid coupler is a female coupler further comprising: a rotatable support radially outwardly of the coupler body, the rotatable support being supported by the coupler body and being configured to rotate about a longitudinal axis of the coupler body, wherein the rotatable support has radially inwardly protruding threads; and a sealing sleeve axially moveable within the coupler body between a closed-position, which restricts fluid flow through the coupler body, and an open position, which permits fluid flow through the coupler body; wherein the seal groove opens radially inwardly such that the seal assembly engages the sealing sleeve when in the open or closed position; and a male nipple comprising: a male nipple body having an axially-extending through-passage for forming at least a portion of a fluid flow path through the male nipple body; a seal groove in the male nipple body, the seal groove having opposing first and second end surfaces that are spaced apart; and a seal assembly disposed in the seal groove between the opposing first and second end surfaces, the seal assembly comprising: a seal ring located in the seal groove at a first position toward the first end surface of the seal groove; a first backup ring located in the seal groove at a second position toward the second end surface of the seal groove, the first backup ring being formed as a delta ring having a wedge shape in transverse cross-section, wherein the first backup ring is made with a non-metallic material; and a second backup ring located in the seal groove interposed between the seal ring and the first backup ring, the second backup ring having an inclined surface in transverse cross-section that interfaces against a complementary inclined surface of the first backup ring, wherein the second backup ring is made with a non-metallic material; wherein a radially outward portion of the male nipple body has radially outwardly protruding threads; wherein a poppet is axially moveable within the male nipple body between a closed-position, which restricts fluid flow through the male nipple body, and an open position, which permits fluid flow through male nipple body; and wherein the seal groove opens radially inwardly such that the seal assembly engages the poppet when in the closed position wherein the radially inwardly protruding threads of the female coupler are configured to threadably engage the radially outwardly protruding threads of the male nipple, and when the male nipple and female coupler are fully mated together, the seal assembly of the male nipple sealing engages the sealing sleeve of the female coupler; and wherein at least when pressurized and heated with zero flow through the coupling, the respective sealing assemblies of the male nipple and female coupler restrict leakage of fluid externally of the coupling.

According to another aspect of the present disclosure, a fluid coupler for a zero-flow fire-resistant quick-disconnect fluid coupling, includes: a coupler body having an axially-extending through-passage for forming at least a portion of a fluid flow path through the coupler body; a seal groove in the coupler body, the seal groove having opposing first and second end surfaces that are spaced apart; and a seal assembly disposed in the seal groove between the opposing first and second end surfaces, the seal assembly comprising: a seal ring located in the seal groove at a first position toward the first end surface of the seal groove; a first backup ring located in the seal groove at a second position toward the second end surface of the seal groove, the first backup ring being formed as a delta ring having a wedge shape in transverse cross-section; and a second backup ring located in the seal groove interposed between the seal ring and the first backup ring, the second backup ring having an inclined surface in transverse cross-section that interfaces against a complementary inclined surface of the first backup ring, and a third backup ring interposed between the second backup ring and the seal ring, the third backup ring abutting the seal ring, wherein the third backup ring is harder than the seal ring and softer than the first and second backup rings.

According to another aspect of the present disclosure, a fluid coupler for a zero-flow fire-resistant quick-disconnect fluid coupling, includes: a coupler body having an axially-extending through-passage for forming at least a portion of a fluid flow path through the coupler body; a valve member axially moveable within the coupler body between a closed-position, which restricts fluid flow through the coupler body, and an open position, which permits fluid flow through the coupler body; a rotatable support radially outwardly of the coupler body, the rotatable support being supported by the coupler body and being configured to rotate about a longitudinal axis of the coupler body, the rotatable support having radially inwardly protruding threads for threadably coupling to a corresponding coupler of the fluid coupling; wherein the rotatable support is coupled to the coupler body via a bearing ring disposed in circumferential gap formed between a radially outwardly protruding shoulder of the coupler body and a radially inwardly protruding shoulder of the rotatable support that is axially spaced from and radially overlaps with the radially outwardly protruding shoulder of the coupler body.

According to another aspect of the present disclosure, a fluid coupler for a zero-flow fire-resistant quick-disconnect fluid coupling, includes: a coupler body having an axially-extending through-passage for forming at least a portion of a fluid flow path through the coupler body; a valve member axially moveable within the coupler body between a closed-position, which restricts fluid flow through the coupler body, and an open position, which permits fluid flow through the coupler body; a rotatable support radially outwardly of the coupler body, the rotatable support being supported by the coupler body and being configured to rotate about a longitudinal axis of the coupler body, the rotatable support having radially inwardly protruding threads for threadably coupling to a corresponding coupler of the fluid coupling; an actuating sleeve radially outwardly of the rotatable support, the actuating sleeve being supported by the rotatable support and being configured for locking engagement with a portion of a corresponding coupler of the fluid coupling when fully coupled together; wherein the rotatable support includes axially extending slots in a radially outer surface of the rotatable support; and wherein the actuating sleeve includes radially inwardly extending protrusions that are slidably disposed in the respective slots to thereby enable the actuating sleeve to move axially relative to the rotatable support and constraining rotational movement of the actuating sleeve relative to the rotatable support for co-rotation together.

According to another aspect of the present disclosure, a fluid coupler for a zero-flow fire-resistant quick-disconnect fluid coupling, includes: a coupler body having an axially-extending through-passage for forming at least a portion of a fluid flow path through the coupler body; a valve member axially moveable within the coupler body between a closed-position, which restricts fluid flow through the coupler body, and an open position, which permits fluid flow through the coupler body; a rotatable support radially outwardly of the coupler body, the rotatable support being supported by the coupler body and being configured to rotate about a longitudinal axis of the coupler body, the rotatable support having radially inwardly protruding threads for threadably coupling to a corresponding coupler of the fluid coupling; an actuating sleeve radially outwardly of the rotatable support, the actuating sleeve being supported by the rotatable support and being configured for locking engagement with a portion of a corresponding coupler of the fluid coupling when fully coupled together; wherein the actuating sleeve includes a seal disposed in a seal groove in a radially inward surface of the actuating sleeve at a forward end portion thereof; and wherein the seal engages a radially outer surface of the rotatable support at a forward end portion thereof.

It is understood that terms such as "top," "bottom," "upper," "lower," "left," "right," "front," "rear," "forward," "rearward," and the like as used herein may refer to an arbitrary frame of reference, rather than to the ordinary gravitational frame of reference.

It is to be understood that all ranges and ratio limits disclosed in the specification and claims may be combined in any manner. The term "about" as used herein refers to any value which lies within the range defined by a variation of up to ±10% of the stated value, for example, ±10%, ±9%, ±8%, ±7%, ±6%, ±5%, ±4%, ±3%, ±2%, ±1%, ±0.01%, or ±0.0% of the stated value, as well as values intervening such stated values.

As used herein, an "operable connection," or a connection by which entities are "operably connected," is one in which the entities are connected in such a way that the entities may perform as intended. An operable connection may be a direct connection or an indirect connection in which an intermediate entity or entities cooperate or otherwise are part of the connection or are in between the operably connected entities. An operable connection or coupling may include the entities being integral and unitary with each other.

As used herein, the phrase "and/or" should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A fluid coupler for a zero-flow fire-resistant quick-disconnect fluid coupling, comprising:
   a coupler body having an axially-extending through-passage for forming at least a portion of a fluid flow path through the coupler body;
   a seal groove in the coupler body, the seal groove having opposing first and second end surfaces that are spaced apart; and
   a seal assembly disposed in the seal groove between the opposing first and second end surfaces, the seal assembly comprising:
   a seal ring located in the seal groove at a first position toward the first end surface of the seal groove;
   a first backup ring located in the seal groove at a second position toward the second end surface of the seal groove, the first backup ring being formed as a delta ring having a wedge shape in transverse cross-section, wherein the first backup ring is made with a non-metallic material;
   a second backup ring located in the seal groove interposed between the seal ring and the first backup ring, the second backup ring having an inclined surface in transverse cross-section that interfaces against a complementary inclined surface of the first backup ring, wherein the second backup ring is made with a non-metallic material; and
   a third backup ring in the seal groove interposed between the second backup ring and the seal ring, the third backup ring having a straight surface in transverse cross-section that interfaces against a complementary straight surface, in transverse cross section, of the second backup ring;
   wherein at least when pressurized and heated with zero flow through the coupler, the sealing assembly restricts leakage of fluid externally of the coupler.

2. The fluid coupler according to claim 1,
   wherein the second backup ring is formed as a half delta ring having a right trapezoid shape in transverse cross-section with the straight surface being a vertical surface opposite the inclined surface that interfaces against the first backup ring; and
   wherein the third backup ring has a rectangular shape in transverse cross-section in which the straight surface of the third backup ring is a vertical surface that interfaces against the vertical surface of the second backup ring.

3. The fluid coupler according to claim 1,
   wherein the seal groove is a circumferential seal groove and the first end surface of the seal groove is located axially upstream of the second end surface in a leak path of the coupler toward a source of fluid pressure, and wherein the second end surface of the seal groove is an inclined surface in transverse cross-section;
   wherein the wedge shape of the first backup ring is configured with a truncated triangular shape in transverse cross-section, the truncated triangular shape having opposite first and second inwardly inclined surfaces, the first inwardly inclined surface configured complementary to, and interfacing against, the inclined surface of the second end surface of the seal groove;
   wherein the second backup ring is configured with a right trapezoid shape in transverse cross-section, the right trapezoid shape having the inclined surface and an opposite vertical surface that includes the straight surface of the second backup ring, the inclined surface configured complementary to, and interfacing against, the second inwardly inclined surface of the first backup ring;
   wherein the third backup ring is configured with a rectangular shape in transverse cross-section, the rectangular shape having opposite first and second vertical surfaces, the first vertical surface including the straight surface of the third backup ring which is configured complementary to, and interfacing against, the vertical surface of the second backup ring; and
   wherein the seal ring is a toroidal O-ring seal that abuts the second vertical surface of the third backup ring, the seal ring being located adjacent to the first end surface of the seal groove.

4. The fluid coupler according to claim 1,
   wherein the seal ring, the first backup ring, the second backup ring, and the third backup ring are each made with a non-metallic material.

5. The fluid coupler according to claim 4,
   wherein the seal ring, the first backup ring, the second backup ring, and the third backup ring are made with different non-metallic materials from each other.

6. The fluid coupler according to claim 1,
   wherein the third backup ring is harder than the seal ring and softer than the first and second backup rings;

wherein the second backup ring is harder than the seal ring and the third backup ring; and wherein the first backup ring is harder than the seal ring and the third backup ring.

7. The fluid coupler according to claim 1,
wherein the first backup ring is a polymeric material that has a thermal degradation temperature that is greater than the respective melting point temperatures of the second backup ring, the third backup ring, and the seal ring; and when the coupler is heated while under fluid pressure to a temperature beyond the respective melting point temperatures of the second backup ring, the third backup ring, and the seal ring, the first backup ring is pushed towards a sealing diameter by at least the second end surface of the seal groove to thereby restrict leakage of fluid externally of the coupler.

8. The fluid coupler according to claim 1,
wherein the third backup ring has greater lubricity than the first and second backup rings.

9. The fluid coupler according to claim 1,
wherein the first backup ring is made with a semi-crystalline polyimide material;
wherein the second backup ring is made with a polyetheretherketone material;
wherein the third backup ring is made with a fluoropolymer material; and
wherein the seal ring is made with an elastomeric material.

10. The fluid coupler according to claim 1,
wherein the fluid coupler is a female coupler further comprising:
a rotatable support radially outwardly of the coupler body, the rotatable support being supported by the coupler body and being configured to rotate about a longitudinal axis of the coupler body, the rotatable support having radially inwardly protruding threads for threadably coupling to a corresponding male nipple;
wherein the rotatable support is coupled to the coupler body via a bearing ring disposed in circumferential gap formed between a radially outwardly protruding shoulder of the coupler body and a radially inwardly protruding shoulder of the rotatable support that is axially spaced from and radially overlaps with the radially outwardly protruding shoulder of the coupler body.

11. The fluid coupler according to claim 1,
wherein the fluid coupler is a female coupler further comprising:
a rotatable support radially outwardly of the coupler body, the rotatable support being supported by the coupler body and being configured to rotate about a longitudinal axis of the coupler body, wherein the rotatable support has radially inwardly protruding threads for threadably coupling to a corresponding male nipple; and
an actuating sleeve radially outwardly of the rotatable support;
wherein the rotatable support includes axially extending slots in a radially outer surface of the rotatable support; and
wherein the actuating sleeve includes radially inwardly extending protrusions that are slidably disposed in the respective slots to thereby enable the actuating sleeve to move axially relative to the rotatable support and constraining rotational movement of the actuating sleeve relative to the rotatable support for co-rotation together.

12. A fluid coupler for a zero-flow fire-resistant quick-disconnect fluid coupling, comprising:
a coupler body having an axially-extending through-passage for forming at least a portion of a fluid flow path through the coupler body;
a seal groove in the coupler body, the seal groove having opposing first and second end surfaces that are spaced apart; and
a seal assembly disposed in the seal groove between the opposing first and second end surfaces, the seal assembly comprising:
a seal ring located in the seal groove at a first position toward the first end surface of the seal groove;
a first backup ring located in the seal groove at a second position toward the second end surface of the seal groove, the first backup ring being formed as a delta ring having a wedge shape in transverse cross-section, wherein the first backup ring is made with a non-metallic material; and
a second backup ring located in the seal groove interposed between the seal ring and the first backup ring, the second backup ring having an inclined surface in transverse cross-section that interfaces against a complementary inclined surface of the first backup ring, wherein the second backup ring is made with a non-metallic material;
wherein the fluid coupler is a male nipple, and the coupler body is a nipple body;
wherein a radially outward portion of the male nipple body has radially outwardly protruding threads for threadably coupling to a corresponding female coupler;
wherein a valve member is axially moveable within the male nipple body between a closed-position, which restricts fluid flow through the male nipple body, and an open position, which permits fluid flow through the male nipple body;
wherein the seal groove opens radially inwardly such that the seal assembly engages the valve member of male nipple when in the closed position; and
wherein at least when pressurized and heated with zero flow through the coupler, the sealing assembly restricts leakage of fluid externally of the coupler.

13. A zero-flow fire-resistant quick-disconnect fluid coupling comprising:
the fluid coupler according to claim 1, in which the fluid coupler is a female coupler further comprising:
a rotatable support radially outwardly of the coupler body, the rotatable support being supported by the coupler body and being configured to rotate about a longitudinal axis of the coupler body, wherein the rotatable support has radially inwardly protruding threads; and
a sealing sleeve axially moveable within the coupler body between a closed-position, which restricts fluid flow through the coupler body, and an open position, which permits fluid flow through the coupler body;
wherein the seal groove opens radially inwardly such that the seal assembly engages the sealing sleeve when in the open or closed position; and
a male nipple comprising:
a male nipple body having an axially-extending through-passage for forming at least a portion of a fluid flow path through the male nipple body;
a seal groove in the male nipple body, the seal groove having opposing first and second end surfaces that are spaced apart; and a seal assembly disposed in the seal groove between the opposing first and second end surfaces, the seal assembly comprising:
a seal ring located in the seal groove at a first position toward the first end surface of the seal groove;
a first backup ring located in the seal groove at a second position toward the second end surface of the seal groove, the first backup ring being formed as a delta ring having a wedge shape in transverse cross-section, wherein the first backup ring is made with a non-metallic material; and
a second backup ring located in the seal groove interposed between the seal ring and the first backup ring, the second backup ring having an inclined surface in transverse cross-section that interfaces against a complementary inclined surface of the first backup ring, wherein the second backup ring is made with a non-metallic material;
wherein a radially outward portion of the male nipple body has radially outwardly protruding threads;
wherein a poppet is axially moveable within the male nipple body between a closed-position, which restricts fluid flow through the male nipple body, and an open position, which permits fluid flow through the male nipple body; and
wherein the seal groove opens radially inwardly such that the seal assembly engages the poppet when in the closed position
wherein the radially inwardly protruding threads of the female coupler are configured to threadably engage the radially outwardly protruding threads of the male nipple, and when the male nipple and female coupler are fully mated together, the seal assembly of the male nipple sealing engages the sealing sleeve of the female coupler; and
wherein at least when pressurized and heated with zero flow through the coupling, the respective sealing assemblies of the male nipple and female coupler restrict leakage of fluid externally of the coupling.

14. A fluid coupler for a zero-flow fire-resistant quick-disconnect fluid coupling, comprising:
a coupler body having an axially-extending through-passage for forming at least a portion of a fluid flow path through the coupler body;
a seal groove in the coupler body, the seal groove having opposing first and second end surfaces that are spaced apart; and
a seal assembly disposed in the seal groove between the opposing first and second end surfaces, the seal assembly comprising:
a seal ring located in the seal groove at a first position toward the first end surface of the seal groove;
a first backup ring located in the seal groove at a second position toward the second end surface of the seal groove, the first backup ring being formed as a delta ring having a wedge shape in transverse cross-section, wherein the first backup ring is made with a non-metallic material; and
a second backup ring located in the seal groove interposed between the seal ring and the first backup ring, the second backup ring having an inclined surface in transverse cross-section that interfaces against a complementary inclined surface of the first backup ring, wherein the second backup ring is made with a non-metallic material;
wherein the fluid coupler is a female coupler further comprising:
a rotatable support radially outwardly of the coupler body, the rotatable support being supported by the coupler body and being configured to rotate about a longitudinal axis of the coupler body, wherein the rotatable support has radially inwardly protruding threads for threadably coupling to a corresponding male nipple; and
a sealing sleeve axially moveable within the coupler body between a closed-position, which restricts fluid flow through the coupler body, and an open position, which permits fluid flow through the coupler body;
wherein the seal groove opens radially inwardly such that the seal assembly engages the sealing sleeve when in the open or closed position; and
wherein at least when pressurized and heated with zero flow through the coupler, the sealing assembly restricts leakage of fluid externally of the coupler.

15. The fluid coupler according to claim 14,
wherein the female coupler further comprises an actuating sleeve radially outwardly of the rotatable support, the actuating sleeve being supported by the rotatable support for co-rotation therewith, and the actuating sleeve being axially movable relative to the rotatable support, the actuating sleeve being forwardly biased to lockingly engage with a portion of a corresponding male nipple when fully coupled together.

16. The fluid coupler according to claim 15,
wherein the actuating sleeve has annular insulating air gaps that surround the seal assembly.

17. A fluid coupler for a zero-flow fire-resistant quick-disconnect fluid coupling, comprising:
a coupler body having an axially-extending through-passage for forming at least a portion of a fluid flow path through the coupler body;
a seal groove in the coupler body, the seal groove having opposing first and second end surfaces that are spaced apart; and
a seal assembly disposed in the seal groove between the opposing first and second end surfaces, the seal assembly comprising:
a seal ring located in the seal groove at a first position toward the first end surface of the seal groove;
a first backup ring located in the seal groove at a second position toward the second end surface of the seal groove, the first backup ring being formed as a delta ring having a wedge shape in transverse cross-section, wherein the first backup ring is made with a non-metallic material; and
a second backup ring located in the seal groove interposed between the seal ring and the first backup ring, the second backup ring having an inclined surface in transverse cross-section that interfaces against a complementary inclined surface of the first backup ring, wherein the second backup ring is made with a non-metallic material;
wherein the fluid coupler is a female coupler further comprising:
a rotatable support radially outwardly of the coupler body, the rotatable support being supported by the coupler body and being configured to rotate about a longitudinal axis of the coupler body, wherein the rotatable support has radially inwardly protruding threads for threadably coupling to a corresponding male nipple;
an actuating sleeve supported radially outwardly of the rotatable support, the actuating sleeve being supported by the rotatable support for co-rotation therewith, and the actuating sleeve being axially movable relative to the rotatable support;

wherein the actuating sleeve includes a seal disposed in a seal groove in a radially inward surface of the actuating sleeve at a forward end portion thereof; and wherein the seal engages a radially outer surface of the rotatable support at a forward end portion thereof; and wherein at least when pressurized and heated with zero flow through the coupler, the sealing assembly restricts leakage of fluid externally of the coupler.

18. A fluid coupler for a zero-flow fire-resistant quick-disconnect fluid coupling, comprising:
    a coupler body having an axially-extending through-passage for forming at least a portion of a fluid flow path through the coupler body;
    a valve member axially moveable within the coupler body between a closed-position, which restricts fluid flow through the coupler body, and an open position, which permits fluid flow through the coupler body;
    a rotatable support radially outwardly of the coupler body, the rotatable support being supported by the coupler body and being configured to rotate about a longitudinal axis of the coupler body, the rotatable support having radially inwardly protruding threads for threadably coupling to a corresponding coupler of the fluid coupling;
    wherein the rotatable support is coupled to the coupler body via a bearing ring disposed in circumferential gap formed between a radially outwardly protruding shoulder of the coupler body and a radially inwardly protruding shoulder of the rotatable support that is axially spaced from and radially overlaps with the radially outwardly protruding shoulder of the coupler body.

19. A fluid coupler for a zero-flow fire-resistant quick-disconnect fluid coupling, comprising:
    a coupler body having an axially-extending through-passage for forming at least a portion of a fluid flow path through the coupler body;
    a valve member axially moveable within the coupler body between a closed-position, which restricts fluid flow through the coupler body, and an open position, which permits fluid flow through the coupler body;
    a rotatable support radially outwardly of the coupler body, the rotatable support being supported by the coupler body and being configured to rotate about a longitudinal axis of the coupler body, the rotatable support having radially inwardly protruding threads for threadably coupling to a corresponding coupler of the fluid coupling;
    an actuating sleeve radially outwardly of the rotatable support, the actuating sleeve being supported by the rotatable support and being configured for locking engagement with a portion of a corresponding coupler of the fluid coupling when fully coupled together;
    wherein the rotatable support includes axially extending slots in a radially outer surface of the rotatable support; and
    wherein the actuating sleeve includes radially inwardly extending protrusions that are slidably disposed in the respective slots to thereby enable the actuating sleeve to move axially relative to the rotatable support and constraining rotational movement of the actuating sleeve relative to the rotatable support for co-rotation together.

* * * * *